(12) United States Patent
Kuroda

(10) Patent No.: US 10,666,324 B2
(45) Date of Patent: May 26, 2020

(54) ROTATION INFORMATION TRANSMISSION APPARATUS

(71) Applicant: KEIO UNIVERSITY, Tokyo (JP)

(72) Inventor: Tadahiro Kuroda, Yokohama (JP)

(73) Assignee: KEIO UNIVERSITY, Tokyo (JP)

(*) Notice: Subject to any disclaimer, the term of this patent is extended or adjusted under 35 U.S.C. 154(b) by 0 days.

(21) Appl. No.: 16/317,884

(22) PCT Filed: Jul. 14, 2017

(86) PCT No.: PCT/JP2017/025756
§ 371 (c)(1),
(2) Date: Jan. 15, 2019

(87) PCT Pub. No.: WO2018/012622
PCT Pub. Date: Jan. 18, 2018

(65) Prior Publication Data
US 2019/0296798 A1    Sep. 26, 2019

(30) Foreign Application Priority Data

Jul. 15, 2016 (JP) .................. 2016-140000

(51) Int. Cl.
*H04B 5/00* (2006.01)
*H04B 5/02* (2006.01)
*G06F 9/30* (2018.01)

(52) U.S. Cl.
CPC ............ *H04B 5/0031* (2013.01); *H04B 5/02* (2013.01); *G06F 9/30134* (2013.01); *H04B 5/0012* (2013.01); *H04B 5/0075* (2013.01)

(58) Field of Classification Search
CPC .............................. H04B 5/0031; H01P 1/062
See application file for complete search history.

(56) References Cited

U.S. PATENT DOCUMENTS

| 5,530,422 A | 6/1996 | Harrison |
| 9,680,231 B2* | 6/2017 | Asai ............... H01Q 21/00 |

(Continued)

FOREIGN PATENT DOCUMENTS

| EP | 2932901 A1 | 10/2015 |
| JP | 62-61430 A | 3/1987 |

(Continued)

OTHER PUBLICATIONS

International Search Report dated Oct. 3, 2017, issued in counterpart International Application No. PCT/JP2017/025756 (4 pages, including Japanese original and English translation).

(Continued)

*Primary Examiner* — Tuan H Nguyen
(74) *Attorney, Agent, or Firm* — Westerman, Hattori, Daniels & Adrian, LLP

(57) ABSTRACT

The invention relates to a rotation information transmission apparatus where wireless communication of data of several Gbps is made possible without miniaturizing the coupler to such an extent that installation is difficult. A first substrate where a first coupler in arc form is provided in an upper portion or a lower portion and a second substrate where a second coupler in arc form of which the length of the arc is shorter than that of the first coupler in arc form is arranged in a location where coupling with the first coupler in arc form is possible are arranged so as to rotate relative to each other by fixing either the first substrate or the second substrate to a non-movable portion and fixing the other of the first substrate or the second substrate to a rotational member.

12 Claims, 26 Drawing Sheets

(56) References Cited

U.S. PATENT DOCUMENTS

| | | | |
|---|---|---|---|
| 2013/0324044 | A1 | 12/2013 | Kuroda et al. |
| 2015/0207541 | A1* | 7/2015 | Kuroda ................ H05K 1/0239 455/41.1 |
| 2015/0255880 | A1 | 9/2015 | Asai et al. |
| 2016/0119034 | A1 | 4/2016 | Kuroda |
| 2016/0336630 | A1 | 11/2016 | Coleman |

FOREIGN PATENT DOCUMENTS

| | | |
|---|---|---|
| JP | 8-224233 A | 9/1996 |
| JP | 9-252553 A | 9/1997 |
| JP | 5213087 B2 | 6/2013 |
| JP | 2014-33432 A | 2/2014 |
| JP | 2014-225768 A | 12/2014 |
| JP | 2015-170936 A | 9/2015 |
| JP | 2015-202415 A | 11/2015 |
| WO | 2015/094802 A1 | 6/2015 |

OTHER PUBLICATIONS

Written Opinion dated Oct. 3, 2017, issued in counterpart International Application No. PCT/JP2017/025756. (10 pages).

* cited by examiner

OUTPUT IS SWITCHED TO D3(5)
WHEN D3(3) AND D2(0) BECOME THE
SAME q TIMES OR MORE

OUTPUT IS SWITCHED TO D2(7) WHEN D2(7) AND D3(5) BECOME THE SAME q TIMES OR MORE

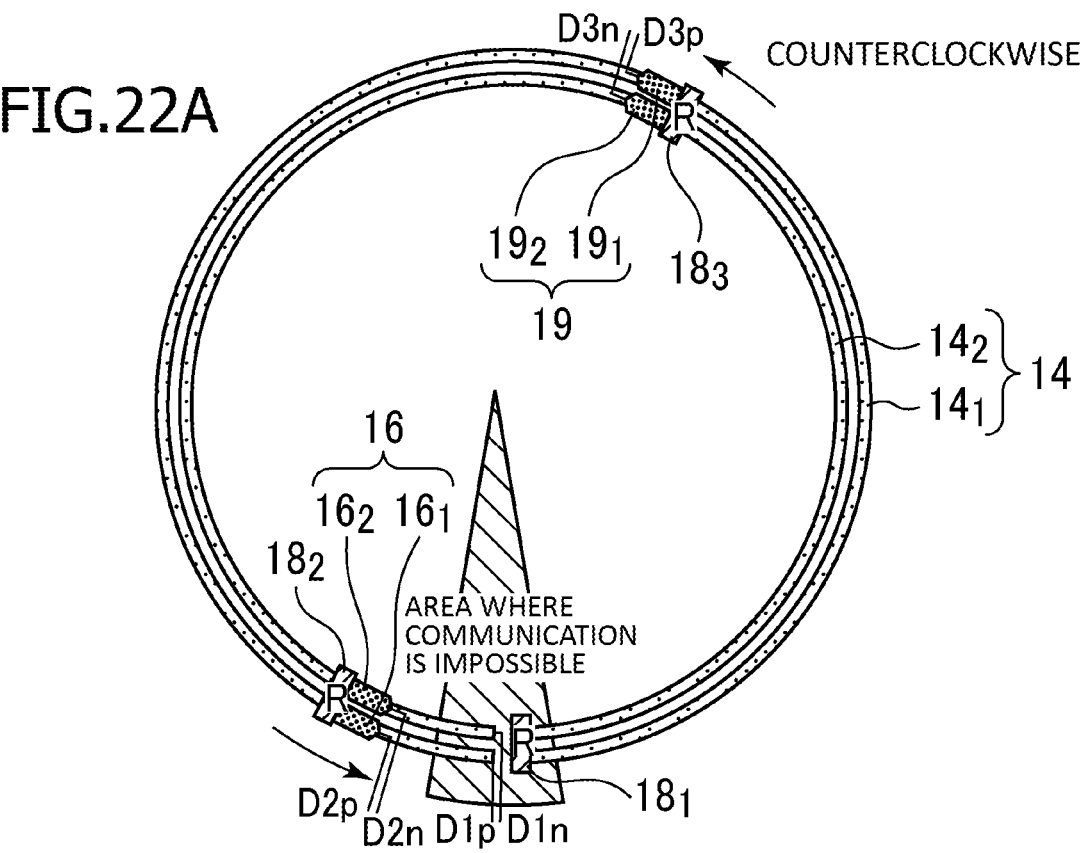
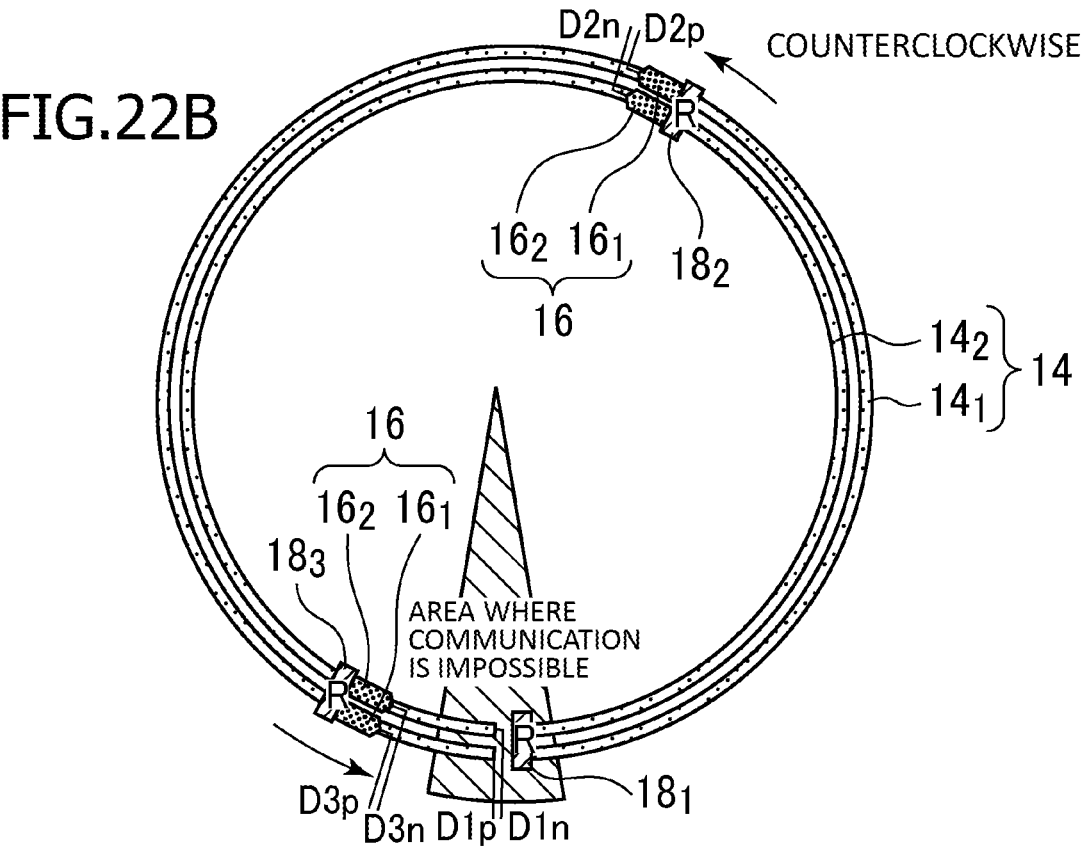

ROTATION INFORMATION TRANSMISSION APPARATUS

TECHNICAL FIELD

The present invention relates to a rotation information transmission apparatus, and in particular, to a configuration for high-speed data communication between substrates, modules or terminals that rotate relative to each other without making contact by using electromagnetic field coupling instead of using a conventional contact-type connector where a brush is pressed against a ring.

BACKGROUND ART

There are some cases where it is required to connect two printed circuit boards (PCBs), two modules or two terminals (hereinafter, simply referred to as substrates as a general term) through high-speed digital signals while the two substrates rotate relative to each other. Examples include surveillance cameras, videos systems for monitoring the surroundings of a car, and robot joints.

In these cases, such a problem arises that wires are twisted as the two substrates rotate relative to each other when the two substrates are connected through the wires. Therefore, signal connection is achieved by pressing an electrode (ring) on one substrate against an electrode (brush) on the other substrate according to the prior art. In such a case, however, contact failure may be caused when the electrodes are worn away, the surface of the electrodes become rusty, or dust attaches to the surface of the electrodes. Therefore, maintenance and inspection are required, which increases costs.

When the characteristic impedance becomes disconnected at the contact point of the electrodes, part of a signal is reflected, which causes distortion to the signal that has passed. This becomes a cause of interference between symbols, which causes a problem where the speed of communication is prevented from increasing. In addition, adjacent brushes make contact with each other at the time of rotation in the case where distance between the terminals of a connector is narrowed, which prevents the miniaturization of the apparatus.

In order to solve these problems concerning the connector, the present inventor has proposed wireless communication of digital data by utilizing capacitive coupling and inductive coupling (together, referred to as electromagnetic field coupling) between transmission lines formed on the substrates that are placed in proximity to each other (see Patent Literature 1 through 3).

Patent Literature 1 proposes wireless communication between two substrates where differential transmission lines, consisting of two transmission lines that are arranged parallel to each other and are matching terminated, are arranged parallel to each other in the same direction. In this case, the shorter the length of the transmission lines is, the broader the band of the coupler is and the higher the speed of the data transfer can be. Alternatively, a pair of single-end (one differential) transmission lines can be used to provide wireless communication in the same manner.

In addition, Patent Literature 2 proposes wireless communication between two substrates where a pair of transmission lines are arranged in close proximity to each other when a differential signal is provided from the two ends of one transmission line. It is also indicated that the two substrates can be rotated relative to each other when the transmission lines are in arc form and the center axes are aligned. Furthermore, an example where one transmission line in arc form is shorter than the other has been proposed.

In addition, Patent Literature 3 proposes wireless communication between two substrates by directly coupling a pair of first transmission lines which are arranged parallel to each other and are matching terminated with a pair of second transmission lines which are arranged so as to face a pair of the first transmission lines.

CITATION LIST

Patent Literature

Patent Literature 1: Japanese Patent No. 5213087
Patent Literature 2: Japanese Laid-open Patent Publication No. 2014-033432
Patent Literature 3: Japanese Laid-open Patent Publication No. 2014-225768

SUMMARY OF INVENTION

Problems to be Solved by the Invention

In order to increase the speed of signal transfer, transmission lines are made shorter for a broader band. In many cases, high-speed signals are used for differential signaling, and therefore, differential signaling is presupposed in the following description, though it is easy to apply to single-ended signaling. In the case of the proposal in Patent Literature 1, there is a relationship approximately as follows between the length of the coupler, the bandwidth of the coupler and the speed of the data transfer.

When the length of the coupler equals 4 mm, the bandwidth of the coupler equals 12 GHz, and the speed of the data transfer equals 16 Gbps.

When the length of the coupler equals 6 mm, the bandwidth of the coupler equals 8 GHz, and the speed of the data transfer equals 11 Gbps.

When the length of the coupler equals 10 mm, the bandwidth of the coupler equals 4.5 GHz, and the speed of the data transfer equals 6 Gbps.

In accordance with the M-PHY standard, which is a standard for the data transfer of several Gbps of mobile industry processer interface (MIPI), for example, the speed of the transfer of 6 Gbps at maximum is required. In order to satisfy this, the coupler requires a bandwidth of at least approximately 4.5 GHz, and the length of the coupler is shorter than 10 mm. In the case where the coupler is in an arc form, the diameter is smaller than approximately 3.2 mm. This coupler is installed at the center of the rotation of the rotating substrate.

When a rotational axis is installed at the center of rotation with a large diameter, however, it is difficult to install a small coupler around the rotational axis. Meanwhile, in the case where the coupler cannot be miniaturized, a problem arises that it is difficult to increase the speed of the signal transfer.

As a result of diligent examination of the description in Patent Literature 2, it has been found to be possible to make one of the transmission lines in arc form sufficiently large to such an extent as to be able to be installed around the rotational axis and to make the other transmission line sufficiently short to such an extent that a necessary bandwidth can be gained. For example, it is possible to make the diameter of the arc of one transmission line be 100 mm, that is to say, make the length of the coupler be 314 mm, and make the length of the arc of the other transmission line be 10 mm.

In this case, however, a new problem arises as follows. In a digital signal of 6 Gbps, the unit interval (UI) between symbols is 333 ps, which corresponds to a frequency of 3 GHz. When a signal of 3 GHz is applied to a transmission line on an FR4 (flame retardant-type 4) substrate, the wavelength becomes approximately 56 mm as a result of the wavelength shortening effects due to a dielectric substance. Accordingly, five bits of signals are aligned along the circumference of a circle of 314 mm.

In this case, the signals that are inputted into the two ends of the coupler are shifted by four bits at the maximum in the timing depending on the location of the arc of the shorter transmission line of which the length is 10 mm. That is to say, different signals are inputted into the two ends of the coupler, and therefore, interference is caused between symbols, and thus, signals cannot be transferred correctly. In other words, the circumference of the large arc must be sufficiently shorter than 56 mm in this case, and thus, there is a problem that the arc cannot be made sufficiently large.

Therefore, an object of the present invention is to make wireless communication of data of several Gbps possible in a rotation information transmission apparatus without miniaturizing the coupler to such an extent that installation becomes difficult.

Means for Solving the Problems

According to one aspect of the invention, a rotation information transmission apparatus includes a first substrate where a first coupler in arc form is provided in an upper portion or in a lower portion, and a second substrate that is provided with a second coupler in arc form that is arranged in a location where coupling with the first coupler in arc form is possible, wherein the length of the arc of the second coupler in arc form is shorter than the length of the arc of the first coupler in arc form, either the first substrate or the second substrate is fixed to a non-movable portion, and the other substrate is fixed to a rotational member so as to be rotatable.

Advantageous Effects of the Invention

One aspect of the invention makes wireless communication of data of several Gbps possible in a rotation information transmission apparatus without miniaturizing the coupler to such an extent that the installation becomes difficult.

BRIEF DESCRIPTION OF DRAWINGS

FIGS. 22A and 22B are diagrams illustrating the rotation information apparatus according to Example 8 of the present invention.

DESCRIPTION OF EMBODIMENTS

Figure 1:
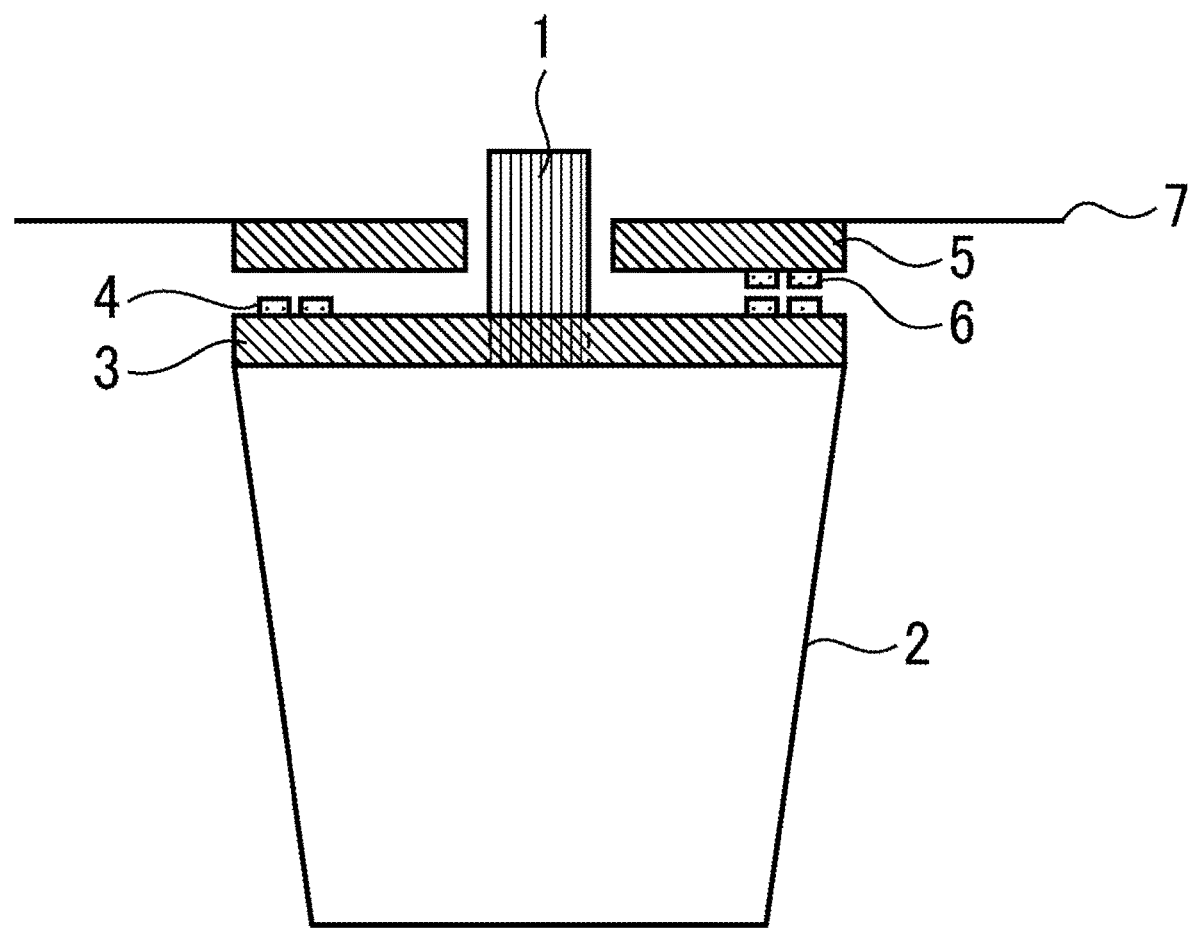
FIG. 1 is a schematic diagram illustrating the structure of the rotation information transmission apparatus according to an embodiment of the present invention.
Figure 2:
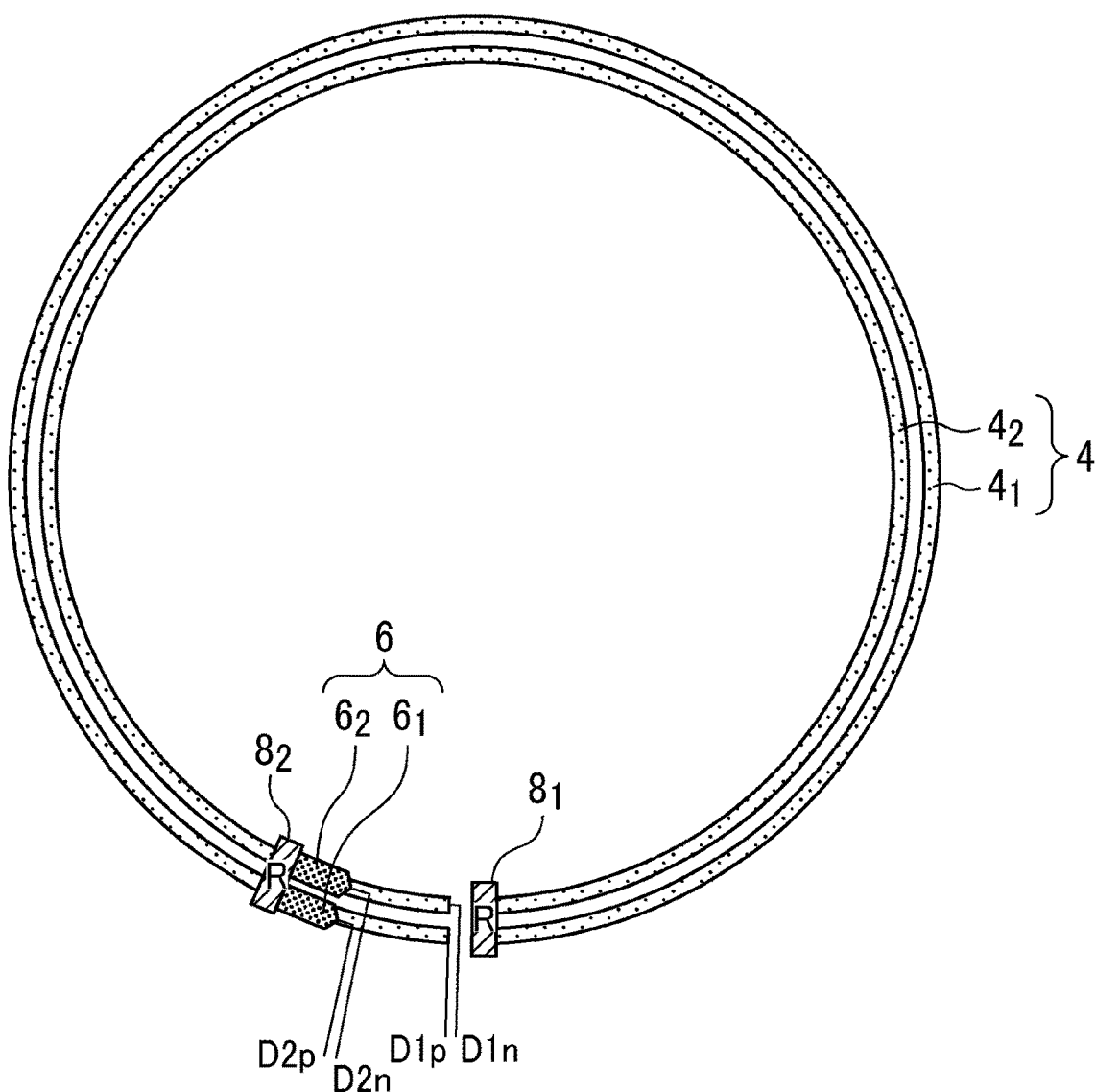
FIG. 2 is a schematic plan diagram illustrating the coupling state of the coupler in the rotation information transmission apparatus according to an embodiment of the present invention.
Figure 3:
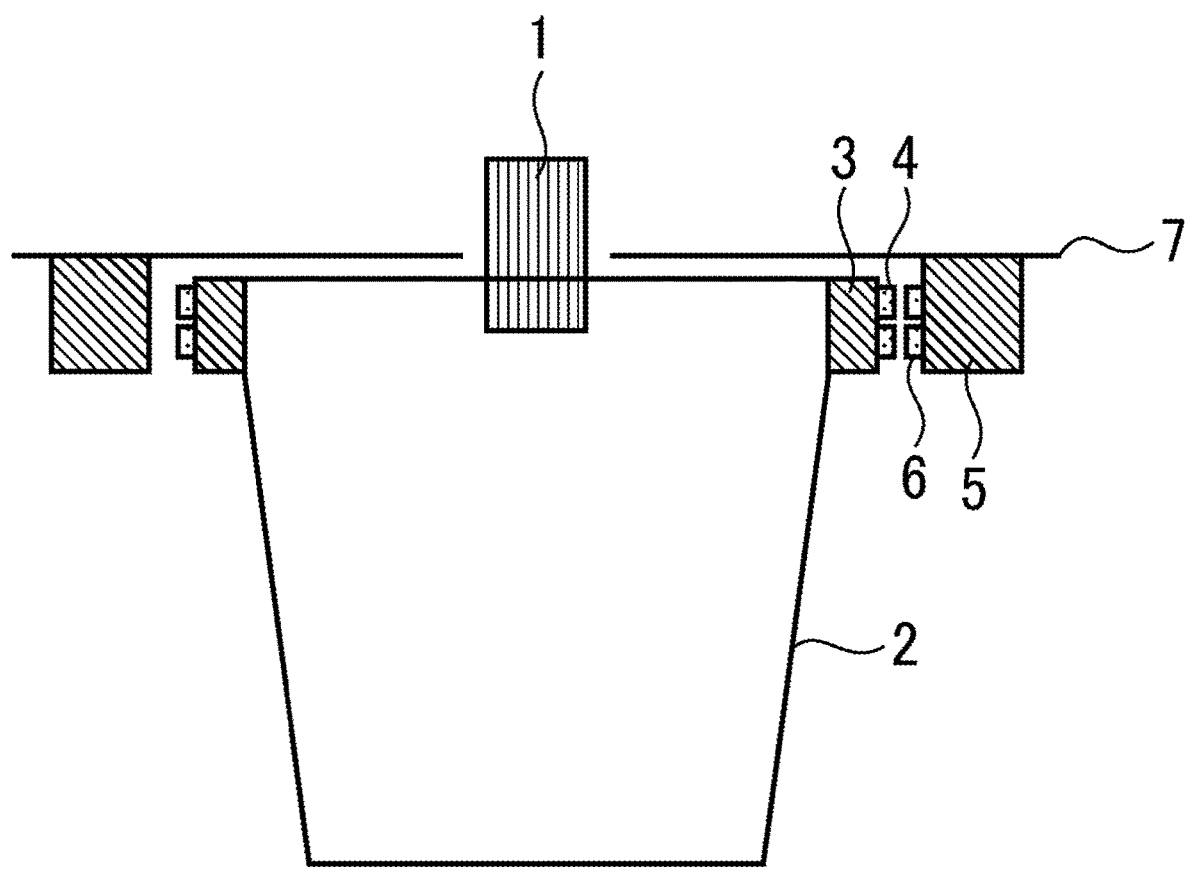
FIG. 3 is a schematic diagram illustrating the structure of the rotation information transmission apparatus according to another embodiment of the present invention.

In reference to FIGS. 1 through 3, the rotation information transmission apparatus according to an embodiment of the present invention is described. As a result of diligent examination of the description in Patent Literature 1 by the present inventor, such a conclusion has been reached that wireless communication with high-speed signals of several Gbps is possible by using the coupler in Patent Literature 1 after being modified to a coupler in arc form without causing a problem concerning the timing even if the size of the coupler is increased.

FIG. 1 is a schematic diagram illustrating the structure of the rotation information transmission apparatus according to an embodiment of the present invention, and FIG. 2 is a schematic plan diagram illustrating the coupling state of the coupler in the rotation information transmission apparatus according to an embodiment of the present invention. As illustrated in FIGS. 1 and 2, the rotation information transmission apparatus according to an embodiment of the present invention has, in an upper portion or a lower portion, a first substrate 3 provided with a first coupler 4 in arc form and a second substrate 5 provided with a second coupler 6 in arc form that is arranged in a location where the coupling with the first coupler 4 in arc form is possible. The length of the arc of the second coupler 6 in arc form is shorter than the length of the arc of the first coupler 4 in arc form. Either the first substrate 3 or the second substrate 5 is fixed to a non-movable portion, and the other of the first substrate 3 or the second substrate 4 is fixed to a rotational member 2 so as to be rotatable. Here, the first substrate 3 is illustrated as being rotatable. That is to say, a rotational member 2 is provided with a rotational axis 1, and the first substrate 3 having a first coupler 4 in arc form is provided in an upper or lower portion of the rotational member 2. In addition, a second coupler 6 in arc form is provided in a location where coupling with the first coupler 4 in arc form is possible on the second substrate 5 which is fixed to a fixed portion 7, and the length of the arc of the second coupler 6 in arc form is shorter than the length of the arc of the first coupler 4 in arc form. In FIG. 1, the rotational axis 1 is provided on the fixed portion 7 side, which is on the ceiling, and therefore, the first coupler 4 in arc form is provided on the upper side of the rotational member 2. In the case where the rotational axis 1 is attached to the fixed portion on the bottom side, however, the first coupler 4 in arc form is provided at the bottom of the rotational member 2.

In this configuration, differential signals that propagate through the first coupler 4 in arc form pass through the same path to reach the second coupler 6 in arc form, and therefore, the above-described problem where the timing shifts does not arise. Here, the shape of the first coupler 4 in arc form and the second coupler 6 in arc form may be perfectly circular or elliptical.

FIG. 3 is a schematic diagram illustrating the structure of the rotation information transmission apparatus according to another embodiment of the present invention, where a first coupler 4 in arc form is provided on the outer peripheral surface of the first substrate 3, and the second coupler 6 in arc form is provided along the inner peripheral surface of the cylindrical hallow portion provided in the second substrate 5. Such a configuration also makes wireless communication of data of several Gbps possible in the rotation information transmission apparatus in the same manner as in the case of FIG. 1 without miniaturizing the coupler to such an extent that installation becomes difficult.

Figure 4A:
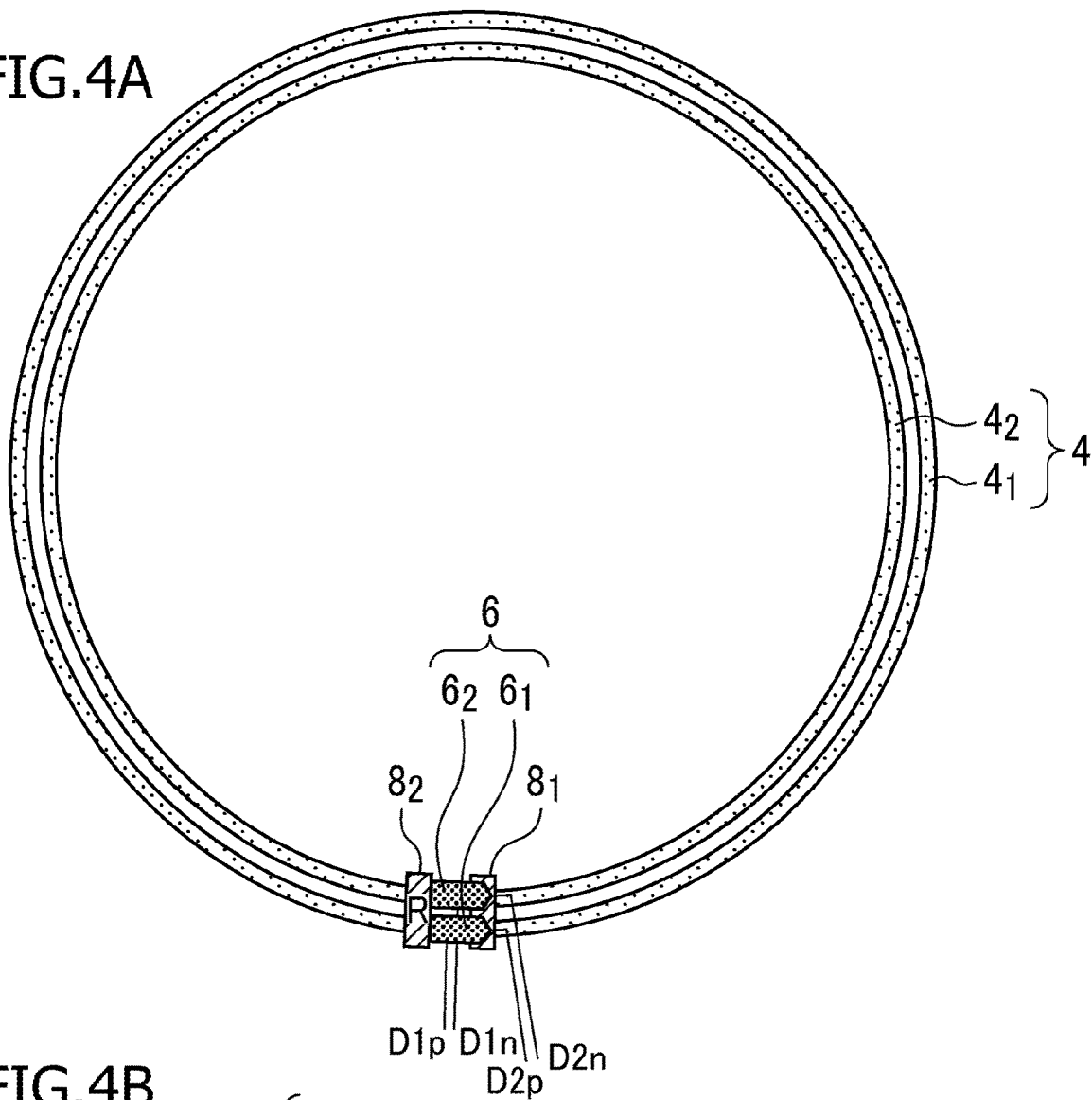
FIGS. 4A and 4B are diagrams illustrating a new problem in the rotation information transmission apparatus according to an embodiment of the present invention.
Figure 4B:
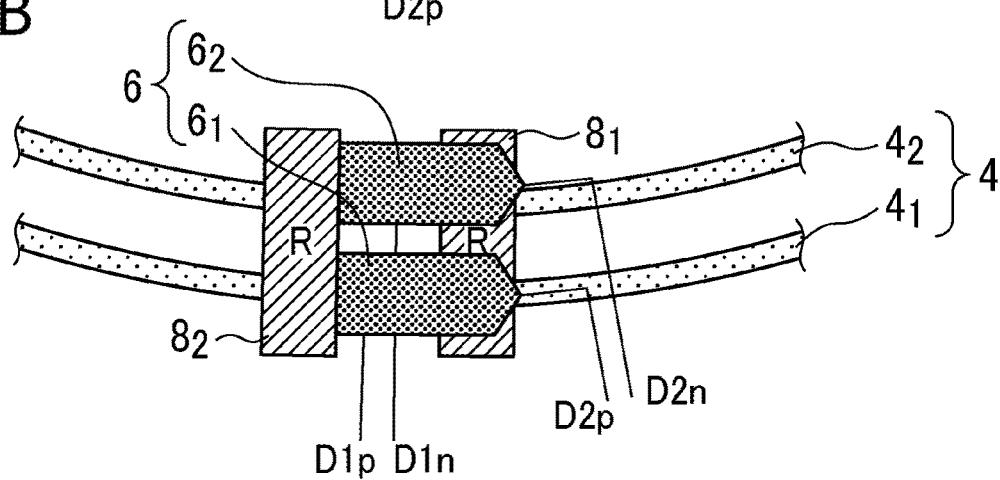

Here, another problem arises in all the cases, and therefore, the situation is described in reference to FIGS. 4A and 4B. FIGS. 4A and 4B are diagrams illustrating a new problem in the rotation information transmission apparatus according to an embodiment of the present invention. FIG. 4A is a schematic plan diagram illustrating the coupling state of the coupler, and FIG. 4B is a diagram illustrating an enlargement of the coupling portion. As illustrated in FIGS. 4A and 4B, interference between symbols occurs in the case where the signal line $6_1$ and the feedback path $6_2$ of the second coupler 6 in arc form couple with the first coupler 4 in arc form to be overlapped each at both the input points for signals $D_{1n}$ and $D_{1p}$ of the signal line $4_1$ and the feedback path $4_2$ of the first coupler 4 in arc form and the terminal points of the first coupler 4 in arc form coupled with a connection member $8_1$. In contrast, interference between symbols does not occur in the case where the input points and the terminal points for signals $D_{1n}$ and $D_{1p}$ of the signal line $4_1$ and the feedback path $4_2$ of the first coupler 4 in arc form are at a sufficient distance away from each other as compared to the length of the signal line $6_1$ and the feedback path $6_2$ of the second coupler 6 in arc form. In this case, however, there is a location where the signal line $6_1$ and the feedback path $6_2$ of the second coupler 6 in arc form do not couple with the signal line $4_1$ and the feedback path $4_2$ of the first coupler 4 in arc form, that is to say, there is an angle at which communication cannot be achieved.

In the case where this point is not considered to be a problem, usage is possible in the coupling state illustrated in FIG. 2. It is desirable, however, that signals can be connected at any angle between 0° and 360° without interference between symbols being caused. Therefore, it is desirable to provide another coupler in arc form as the third coupler in arc form on the second substrate 5 so that at least either the second coupler 6 in arc form and the third coupler in arc form always couples with the first coupler 4 in arc form.

In this case, the second coupler 6 in arc form and the third coupler in arc form may be arranged in proximity at such a distance that the same digital signals from the first coupler 4 in arc form can be received, and the output from the second coupler 6 in arc form and the output from the third coupler in arc form may be switched for signal processing.

Alternatively, the second coupler 6 in arc form and the third coupler in arc form may be arranged at such a distance that different digital signals from the first coupler 4 in arc form can be received, and the output from the second coupler 6 in arc form and the output from the third coupler in arc form may be switched for signal processing.

In order for the output from the second coupler 6 in arc form and the output from the third coupler in arc form to be switched for signal processing, a first coupler for control signals may be provided on the first substrate 3, and a second coupler for control signals may be provided on the second substrate 5 in such a location where the coupling with the first coupler for control signals is possible while the first substrate 3 rotates. In this case, the output from the second coupler 6 in arc form and the output from the third coupler 7 in arc form are switched in response to the output from the second coupler for control signals.

In order to prevent data from being missed in the outputs from the second coupler 6 in arc form and the third coupler in arc form, a resistor for storing the output from the second coupler 6 in arc form and the output from the third coupler in arc form may further be provided.

The first coupler 4 in arc form, the second coupler 6 in arc form and the third coupler in arc form may respectively be provided with a signal line in arc form and a feedback path in arc form so that one end of each signal line and one end of each feedback path are matching terminated with connection members $8_1$ or $8_2$ made of a terminal resistor.

Alternatively, the first coupler 4 in arc form, the second coupler 6 in arc form and the third coupler in arc form may respectively be provided with a signal line in arc form and a feedback path in arc form so that one end of each signal line and one end of each feedback path may be connected through a connection member $8_1$ or $8_2$ made of a conductor.

It is desirable for the center angle of the first coupler 4 in arc form to be 350° or greater, and it is desirable for the length of the arc of the second coupler 6 in arc form and the length of the arc of the third coupler in arc form to be such a length for securing the bandwidth of the digital signals to be used or shorter.

In the case where the second coupler 6 in arc form or the third coupler in arc form of which the length of the arc is 6 mm rotates relative to the first coupler 4 in arc form at a speed of 1 meter per second, for example, it takes 3 ms for the second coupler 6 in arc form or the third coupler in arc form to move 3 mm, which is half the length of the arc thereof. Meanwhile, the symbol unit interval (UI) of the digital signals of 6 Gbps is 333 ps, which is smaller by seven digits as compared to 3 mm, which is half the length of the arc of the second coupler 6 in arc form or the third coupler in arc form. Accordingly, the distance by which the second coupler 6 in arc form or the third coupler in arc form moves while bits before and after a symbol are transferred is approximately 1/10,000,000 of the length of the coupler, which is equal to the state where the coupler stops, and therefore data communication is normally performed while the coupler moves.

In the embodiment of the present invention, the second coupler in arc form of which the length of the arc is short is coupled with the first coupler in arc form of which the length of the arc is long, and therefore, the couplers can be made large to such an extent that the couplers can be installed around the rotational axis. In addition, signals can be connected at any angle from 0° to 360° by providing a third coupler in arc form, which makes it possible to increase the speed of transfer. Here, as examples of the object to which the rotation information transmission apparatus is applied, rotation information apparatuses such as surveillance cameras and video systems for monitoring the surrounding of a car and robot joints can be cited.

Example 1

Figure 5:
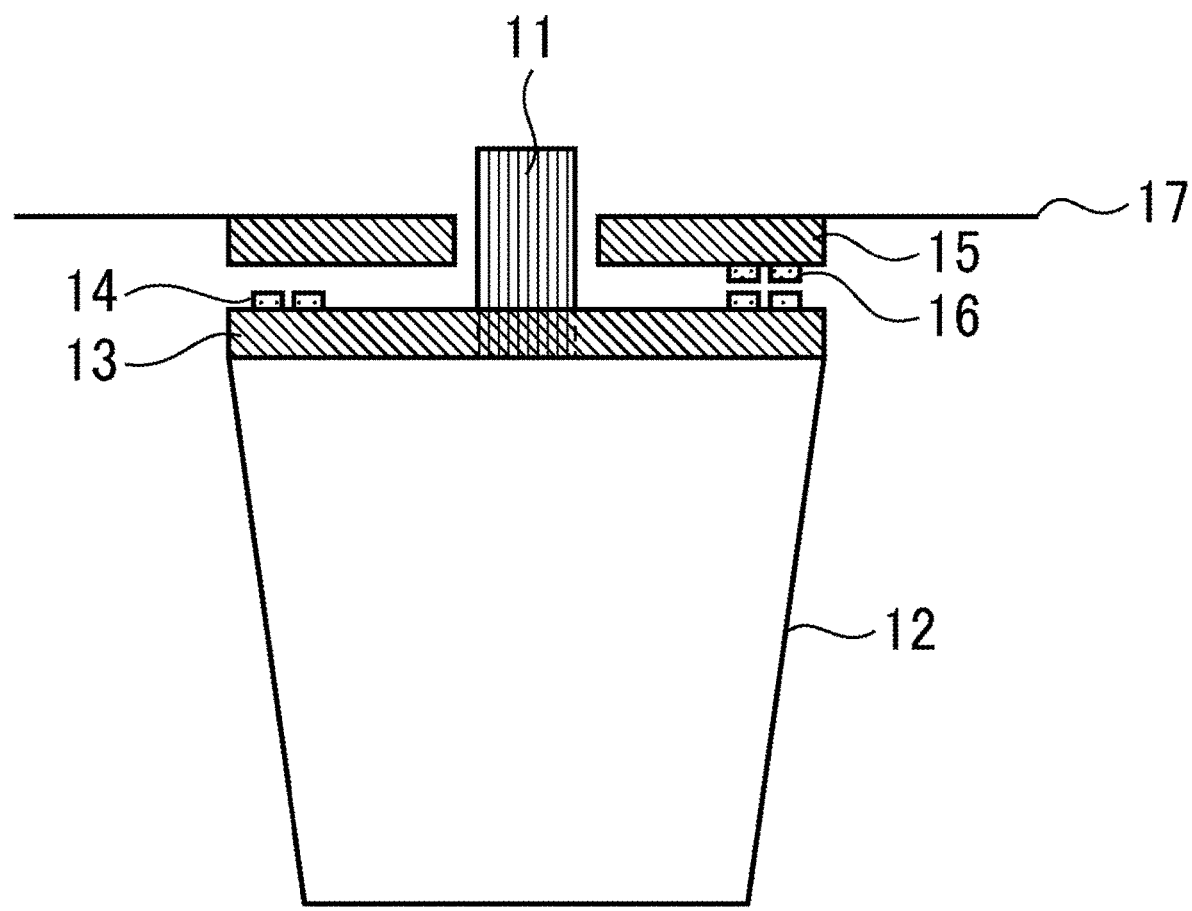
FIG. 5 is a schematic diagram illustrating the structure of the rotation information apparatus according to Example 1 of the present invention.
Figure 6:
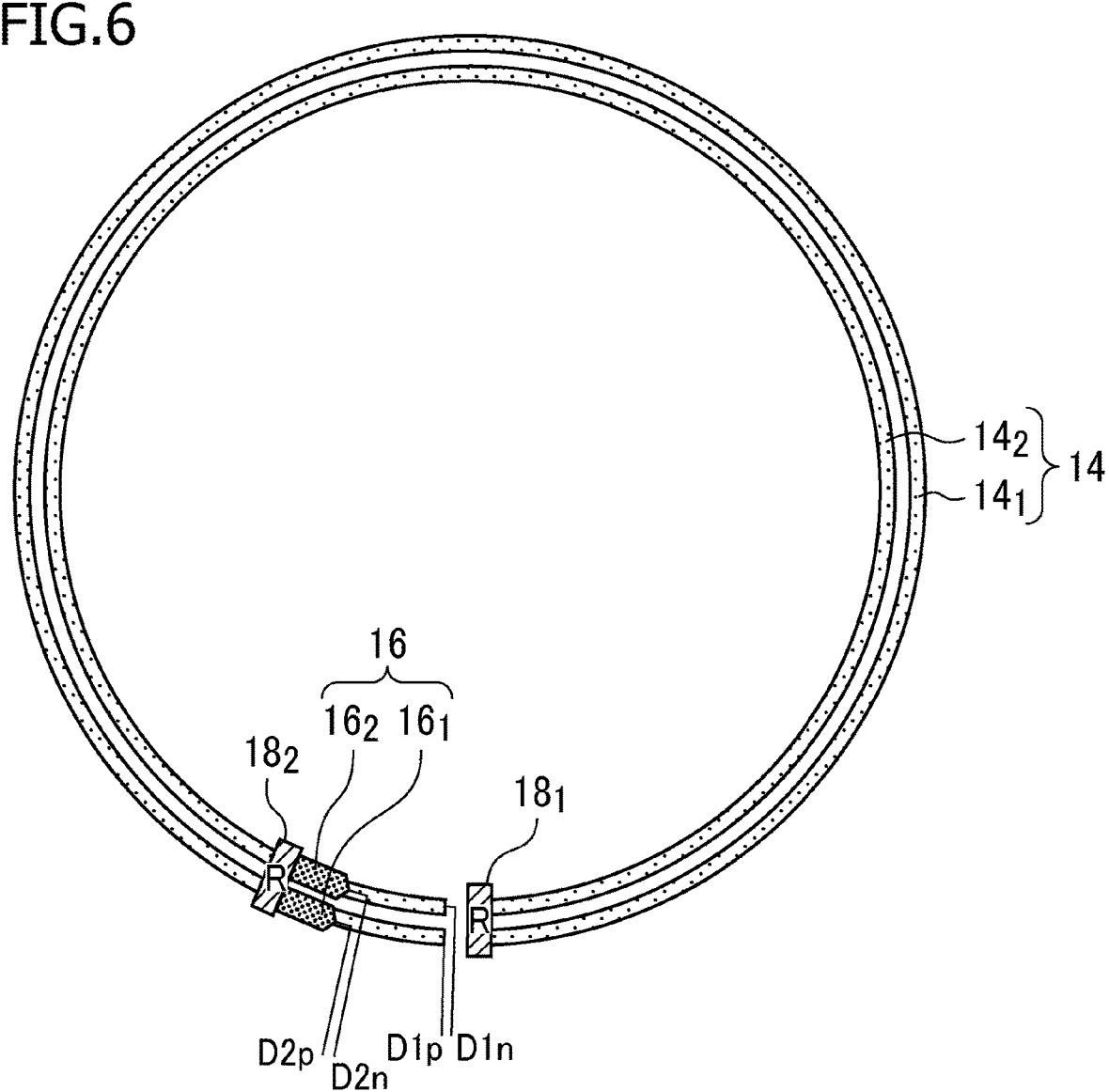
FIG. 6 is a schematic plan diagram illustrating the coupling state of the couplers in the rotation information apparatus according to Example 1 of the present invention.

Next, the rotation information apparatus according to Example 1 of the present invention is described in reference to FIGS. 5 and 6. FIG. 5 is a schematic diagram illustrating the structure of the rotation information apparatus according to Example 1 of the present invention, where the apparatus is provided with a rotation member 12 having a rotational axis 11, and a substrate 13 having a coupler 14 in arc form is provided in the upper portion of the rotation member 12. In addition, a coupler 16 in arc form of which the length of the arc is short is provided on the substrate 15 that is fixed to the ceiling 17 in such a location that makes the coupling with the coupler 14 in arc form possible. Alternatively, the coupler 14 in arc form may be fixed, and the coupler 16 in arc form of which the length of the arc is short may rotate.

FIG. 6 is a schematic plan diagram illustrating the coupling state of the couplers in the rotation information apparatus according to Example 1 of the present invention. The coupler 16 in arc form having the same curvature radius as the coupler 14 in arc form of which the center angle is 355° is provided in a location where coupling with the coupler 14 in arc form is possible. Here, as a typical example, the coupler 14 in arc form is provided with a signal line $14_1$ and a feedback path $14_2$ of which the line width is 2 mm in such a manner that the average radius becomes 50 mm, and the matching termination is achieved with a terminal resistor $18_1$. Meanwhile, the coupler 16 in arc form is made of a signal line $16_1$ and a feedback path $16_2$ of which the average length of the arc is in a range from 4 mm to 10 mm, for example, 10 mm, in such a manner that matching termination is achieved with a terminal resistor $18_2$.

Differential signals $D_{1p}$ and $D_{1n}$ generated by the rotation apparatus (12) are outputted to the coupler 14 in arc form and are outputted from the coupler 16 in arc form as $D_{2p}$ and $D_{2n}$. In this case, interference between symbols occurs when the coupler 16 in arc form couples with the coupler 14 in arc form to be overlapped at both the input points for signals $D_{1p}$ and $D_{1n}$ of the coupler 14 in arc form and the terminal points of the coupler 14 coupled with the terminal resistor $18_1$. In the case where such a point is not considered to be a problem, however, the apparatus can be used as an actual device.

Example 2

Figure 7A:
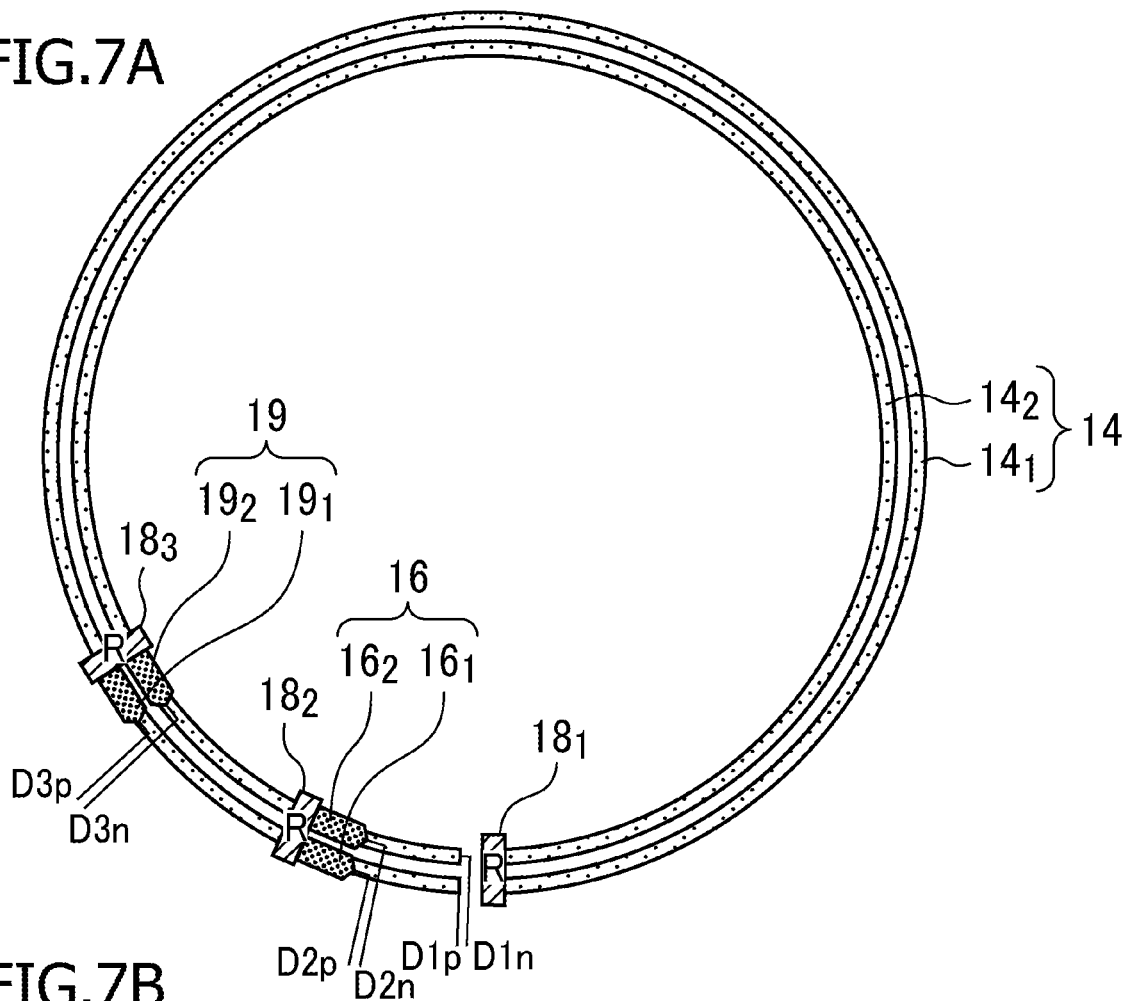
FIGS. 7A and 7B are diagrams illustrating the rotation information apparatus according to Example 2 of the present invention.

Next, the rotation information apparatus according to Example 2 of the present invention is described in reference to FIGS. 7A through 10B. FIGS. 7A and 7B are diagrams illustrating the rotation information apparatus according to Example 2 of the present invention. FIG. 7A is a schematic diagram illustrating the structure, and FIG. 7B is a diagram illustrating the structure of the switching circuit for switching output signals. Here, the state in which this rotation information apparatus is attached is the same as that in Example 1 that has been described above. As illustrated in FIG. 7A, a coupler 16 in arc form having the same curvature radius as a coupler 14 in arc form of which the center angle is 355° is provided in a location where the coupling with the coupler 14 in arc form is possible in the same manner as in Example 1. Meanwhile, the coupler 16 in arc form is provided on a substrate (15) in a location where the coupling with the coupler 14 in arc form is possible in the same manner as in Example 1, and at the same time, a coupler 19 in arc form that is the same as the coupler 16 in arc form is provided. In this case, the coupler 16 in arc form and the coupler 19 in arc form are arranged in proximity at a distance where the same digital signals from the coupler 14 in arc form can be received.

Figure 7B:
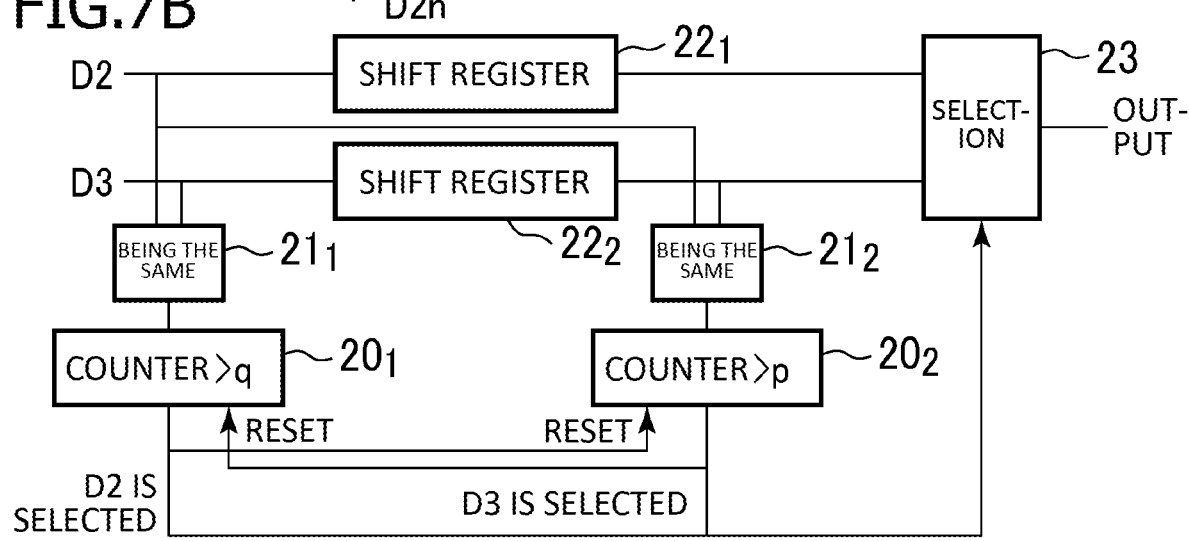

FIG. 7B is a diagram illustrating the structure of a switching circuit for switching output signals. A pair of counters $20_1$ and $20_2$, a pair of determination circuits $21_1$ and $21_2$, a pair of shift registers $22_1$ and $22_2$, and a selection circuit 23 are provided.

Next, the switching of output signals is described in reference to FIGS. 8A through 10B, where the respective couplers are illustrated as symbols. The upper portion of each diagram provides a schematic plan diagram, and the lower portion provides a development diagram illustrating the coupler 14 in arc form as being extended in linear form. Here, for the ease of understanding, the couplers 16 and 19 in arc form are rotated; however, the coupler 14 in arc form actually rotates. Alternatively, as illustrated in the diagrams, the coupler 14 in arc form may be fixed, and the couplers 16 and 19 in arc form may be rotated.

Figure 8A:
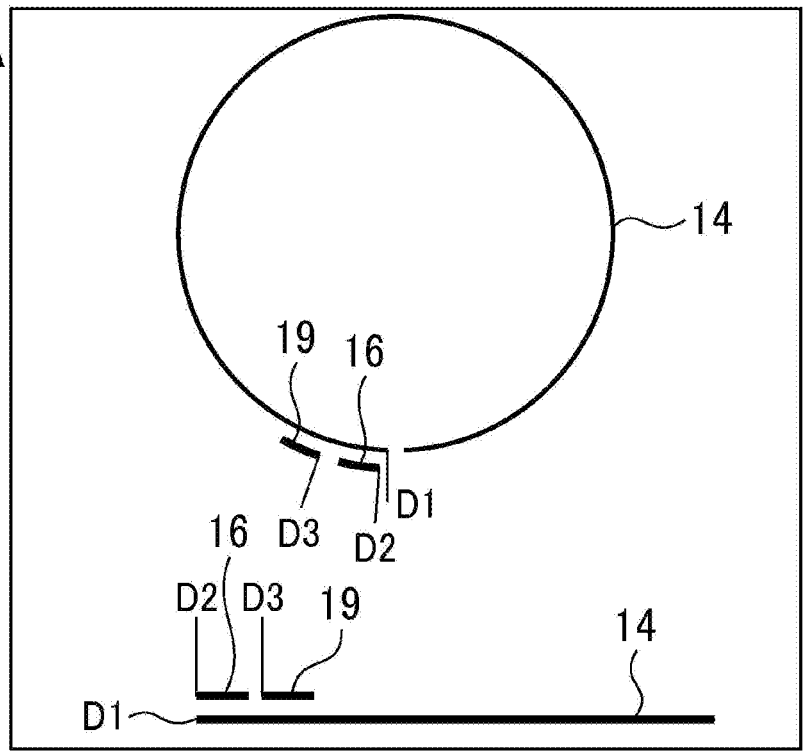
FIGS. 8A and 8B are diagrams illustrating the output signal passing on the way in the rotation information apparatus according to Example 2 of the present invention.
Figure 8B:
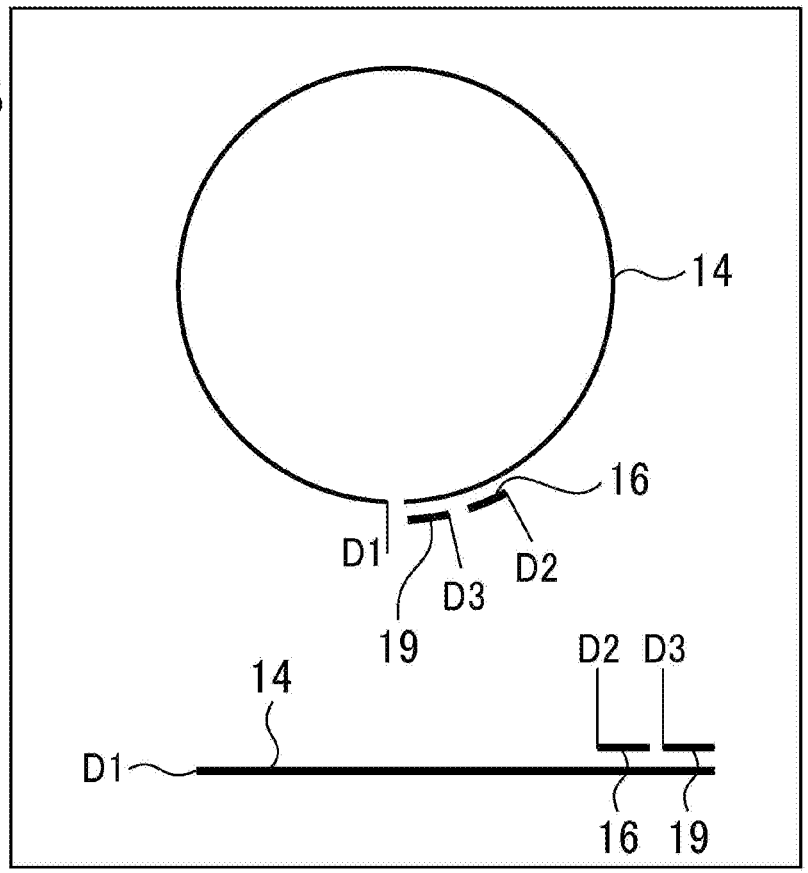

Signals $D_{1p}$ and $D_{1n}$ appear as outputs $D_{2p}$ and $D_{2n}$ from the coupler 16 in arc form in the coupling location illustrated in FIGS. 8A and 8B, and the signal components that have not coupled appear as outputs $D_{3p}$ and $D_{3n}$ from the coupler 19 in arc form that is placed behind the coupler 16 in arc form. In this case, though the digital signal pattern is the same between the outputs $D_{2p}$ and $D_{2n}$ from the coupler 16 in arc form and the outputs $D_{3p}$ and $D_{3n}$ from the coupler 19 in arc form, the outputs $D_{2p}$ and $D_{2n}$ from the coupler 16 in arc form that are initially received are stronger, and therefore selected as transfer signals to the substrate (15).

Figure 9A:
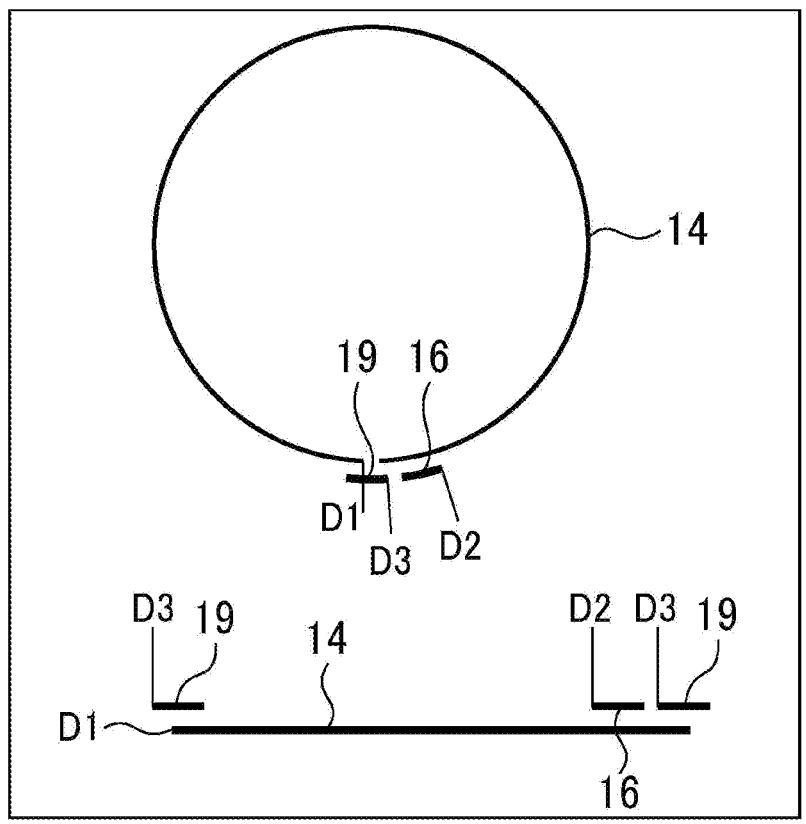
FIGS. 9A and 9B are diagrams illustrating the output signal passing on the way after the state in FIGS. 8A and 8B in the rotation information apparatus according to Example 2 of the present invention.
Figure 9B:
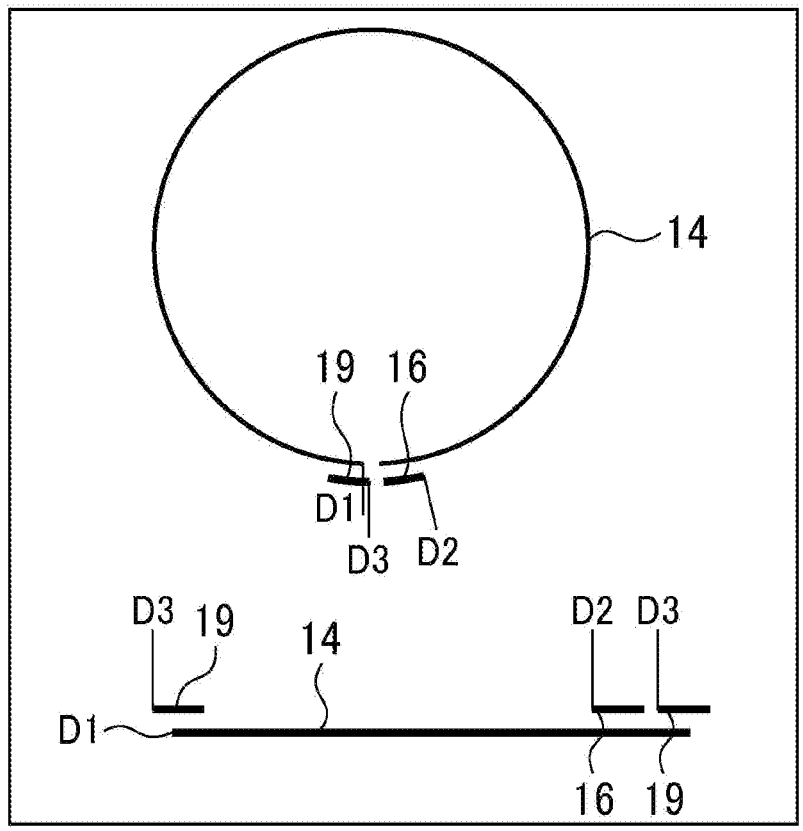

When the coupler 14 in arc form further rotates from the location in FIG. 9A to the location in FIG. 9B, the coupler 16 in arc form cannot correctly couple with the coupler 14 in arc form, and the signals appear correctly only as the outputs $D_{2p}$ and $D_{2n}$ from the coupler 16 in arc form. In this state, the outputs $D_{2p}$ and $D_{2n}$ from the coupler 16 in arc form are still selected as the transfer signals to the substrate (15) as before.

Figure 10A:
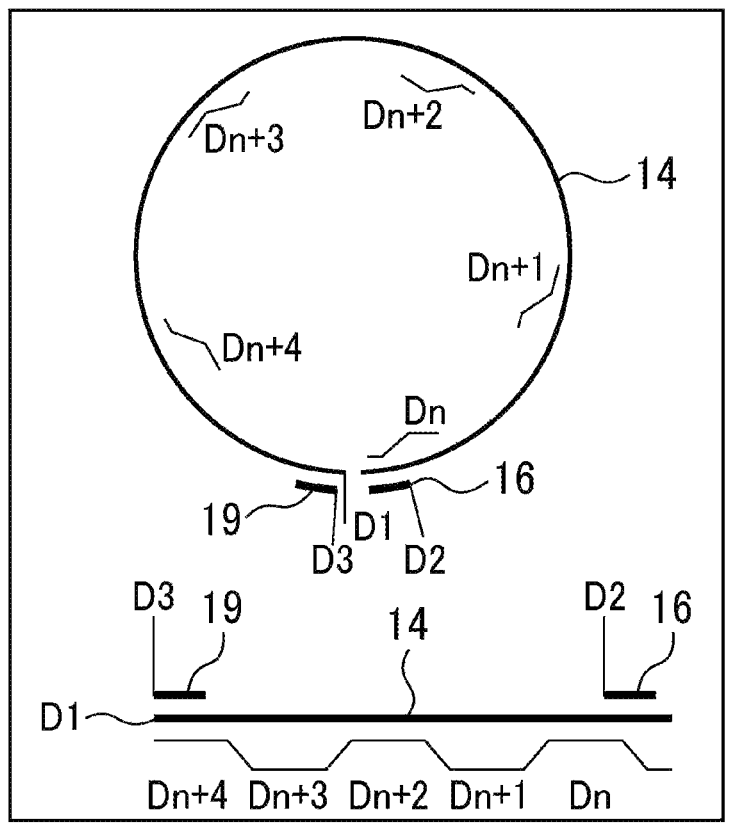
FIGS. 10A and 10B are diagrams illustrating the output signal after the state in FIGS. 9A and 9B in the rotation information apparatus according to Example 2 of the present invention.
Figure 10B:
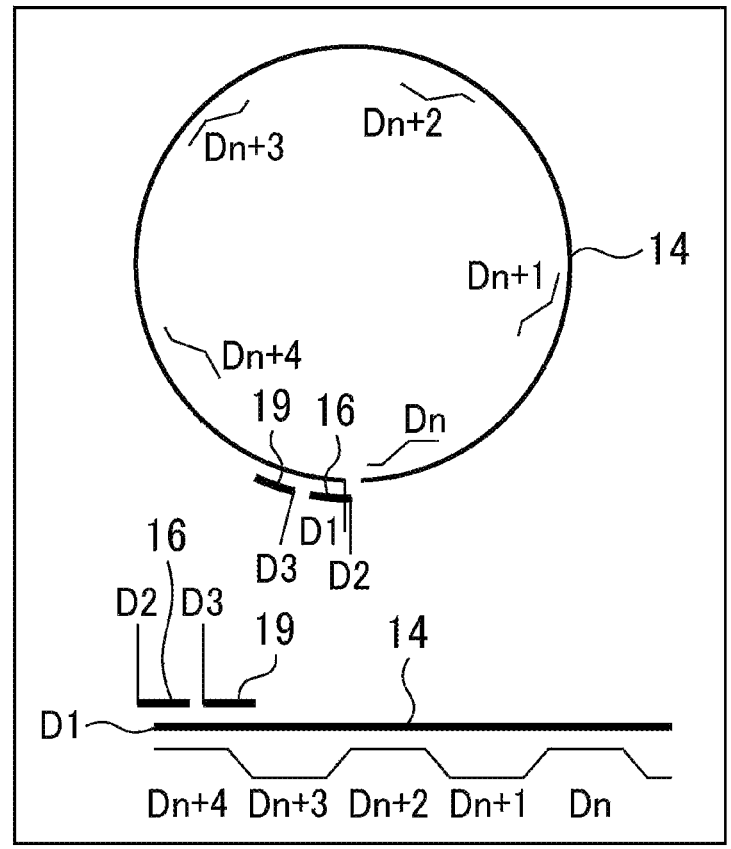

When the coupler 14 in arc form further rotates from the location in FIG. 10A to the location illustrated in FIG. 10B, the coupler 19 in arc form correctly couples with the coupler 14 in arc form. Though the coupler 16 in arc form correctly couples with the coupler 14 in arc form for a while, the coupler 16 in arc form soon fails to couple correctly, and an error signal is outputted from the coupler 16 in arc form. Before that, the outputs $D_{3p}$ and $D_{3n}$ from the coupler 19 in arc form are selectively switched as transfer signals to the substrate (15).

Here, there are some points that are required to be noted at the time of switching. Several digital signals are aligned between the coupler 19 in arc form and the coupler 16 in arc form. In the previous assumption, five bits of signal are aligned along the circumference of a circle of 314 mm. In this case, four digital signals are aligned between the coupler 19 in arc form and the coupler 16 in arc form as illustrated in FIG. 10A.

That is to say, when the coupler 16 in arc form outputs the signal $D_n$, the signal $D_{n+4}$ that is to be outputted to the coupler 16 in arc form in the fourth time after this is being outputted at that time to the coupler 19 in arc form. Accordingly, in the case where the outputs $D_{3p}$ and $D_{3n}$ from the coupler 19 in arc form are selectively switched as transfer signals to the substrate (15), three signals ($D_{n+1}$, $D_{n+2}$ and $D_{n+3}$) between the two couplers fail to be transferred. There are some cases where this may be allowed depending on the application.

In the case where this is not allowed, a plurality of bits of the output from the coupler 19 in arc form may be stored and switched in such a manner that signals are continuously outputted without being missed. Concretely, when signals are switched from $D_{2p}$ and $D_{2n}$ to $D_{3p}$ and $D_{3n}$ after the signal $D_n$ has been outputted, a four-bit shift register $22_2$ that is attached to the portion to which $D_{3p}$ and $D_{3n}$ are outputted is used to continuously output the signal $D_n$, and after that sequentially outputs the signals $D_{n+1}$, $D_{n+2}$, $D_{n+3}$ and $D_{n+4}$.

In order to determine the timing according to which output signals are switched, the determination circuit $21_2$ determines before switching whether or not the signal $D_n$ that is gained by delaying the output $D_{3p}$ or $D_{3n}$ from the coupler 19 in arc form by N bits by the shift register $22_2$ is sufficiently (over predetermined p bits) the same as the signal $D_n$ that is gained as the output $D_{2p}$ or $D_{2n}$ from the coupler 16 in arc form. In the case where five bits of signals are aligned along the circumference of a circle of 314 mm, N=4. The method for finding N may be the calculation at the time of designing or digital calibration in the operation environment. The timing for switching may be found by using another coupler.

When the coupler 14 in arc form further rotates, the coupler 16 in arc form again sufficiently couples with the coupler 14 in arc form for correct transfer as illustrated in FIG. 8A. The determination circuit $21_1$ determines whether or not the output from the coupler 16 in arc form and the output from the coupler 19 in arc form are sufficiently (over predetermined q bits) the same, and the output from the coupler 16 in arc form is again selectively switched as the transfer signal to the substrate (15). There is a possibility that several bits of data may be lost at the time of switching in the same manner as in the previous description.

As described above, two couplers 16 and 19 in arc form of which the length of the arc is short are provided on the substrate 15 side in Example 2 of the present invention, and therefore, signals can be connected at any angle from 0° to 360° by switching output signals. In addition, a shift register is used to prevent data from being missed at the time of switching, and therefore, interference between symbols is not caused.

Example 3

Figure 11A:
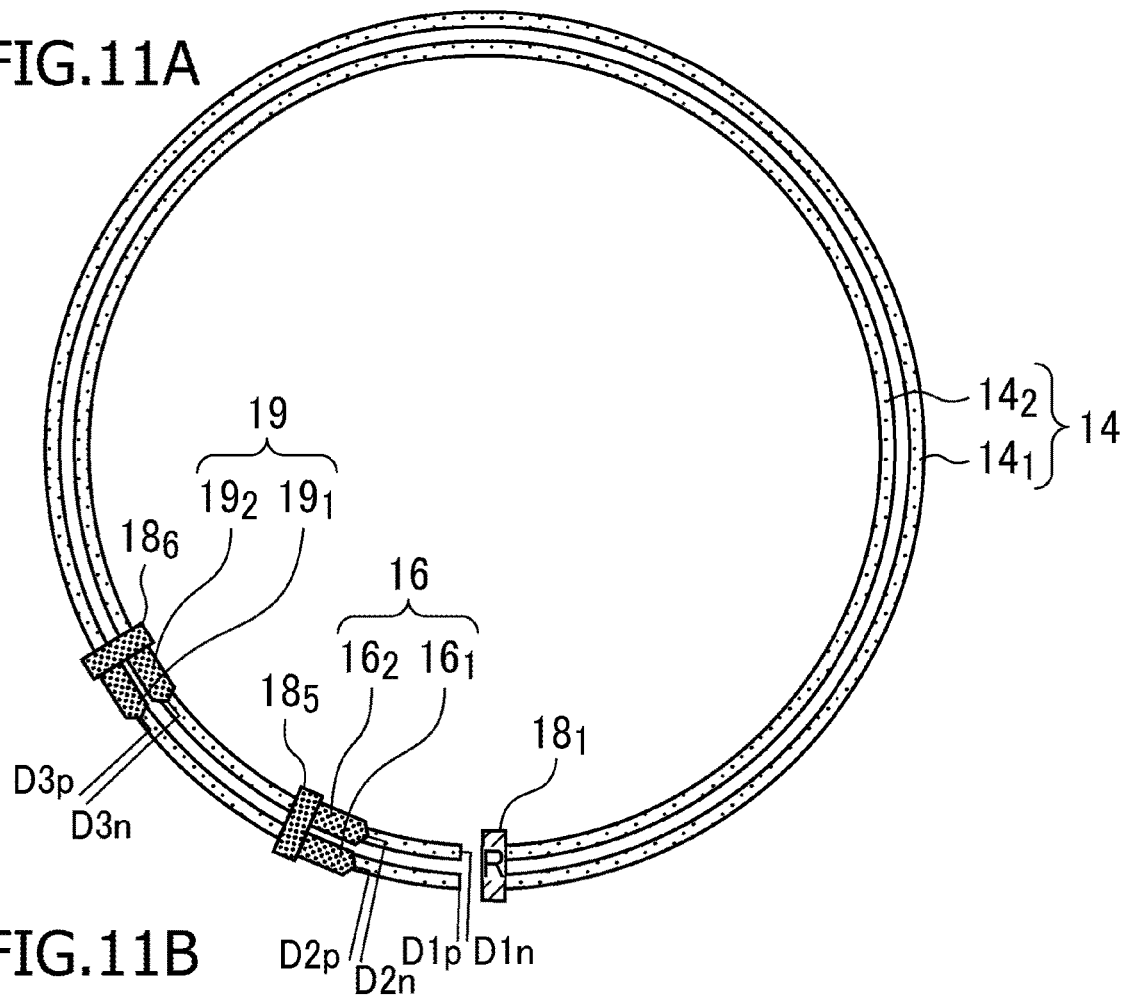
FIGS. 11A and 11B are diagrams illustrating the rotation information apparatus according to Example 3 of the present invention.
Figure 11B:
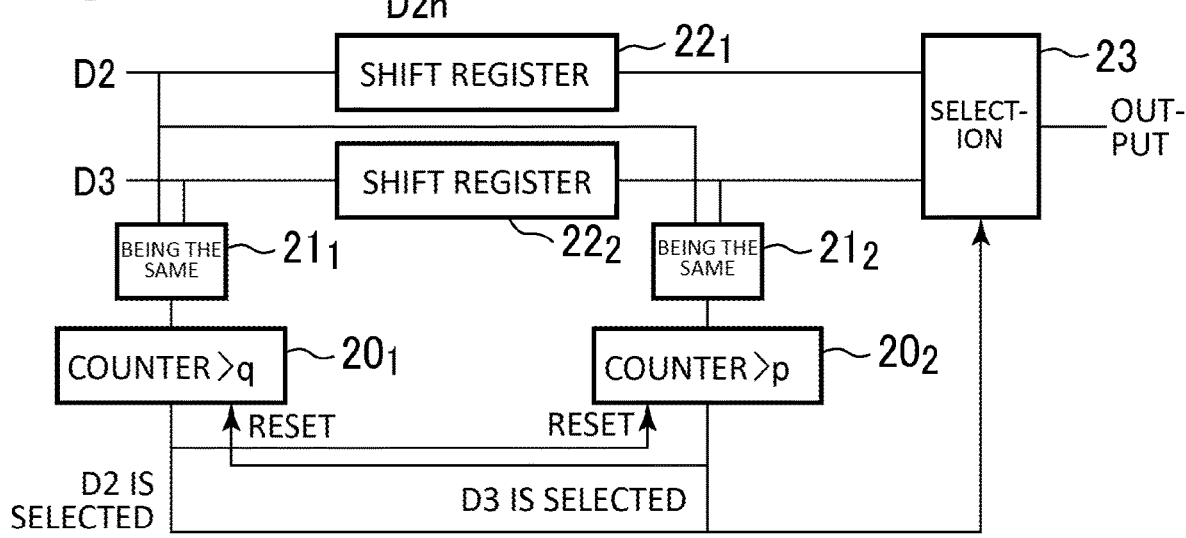

Next, the rotation information apparatus according to Example 3 of the present invention is described in reference to FIGS. 11A and 11B. The rotation information apparatus according to Example 3 is the same as in Example 2, except the point that the terminal resistor in the couplers 16 in arc form and 19 in arc form in Example 2 is replaced with a conductor for short-circuiting. FIGS. 11A and 11B are diagrams illustrating the rotation information apparatus according to Example 3 of the present invention. FIG. 11A is a schematic diagram illustrating the structure, and FIG. 11B is a diagram illustrating the structure of a switching circuit for switching output signals. Here, the state of attachment of this rotation information apparatus is the same as in Example 2 that is described above. As illustrated in FIG. 11A, in Example 3 of the present invention, a coupler 14 in arc form is provided on a substrate (13) in the same manner as in Example 2, and at the same time, couplers 16 and 19 in arc form having the same curvature radius as the coupler 14 in arc form are provided on a substrate (15) in a location where the coupling with the coupler 14 in arc form is possible. The coupler 14 in arc form is matching terminated with a terminal resistor $18_1$, whereas the couplers 16 in arc form and 19 in arc form are short-circuited by the conductors $18_5$ and $18_6$ for short-circuiting. In this case, the couplers 16 and 19 in arc form are arranged in proximity at a distance where the same digital signals from the coupler 14 in arc form can be received.

FIG. 11B is a diagram illustrating the structure of a switching circuit for switching output signals. A pair of counters $20_1$ and $20_2$, a pair of determination circuits $21_1$ and $21_2$, a pair of shift registers $22_1$ and $22_2$, and a selection circuit 23 are provided.

In Example 3 of the present invention, short-circuiting conductors $18_5$ and $18_6$ are used instead of terminal resistors in the couplers 16 and 19 in arc form. Thus, it becomes possible to effectively use signals that have been discarded through terminal resistors in a far-end coupling portion by linking the end portions of the pair of coupling electrodes of the couplers 16 and 19 in arc form, though the intensity of the signals is ½ of those in the near-end coupling portion and the polarity of the signals is inverted.

Example 4

Figure 12A:
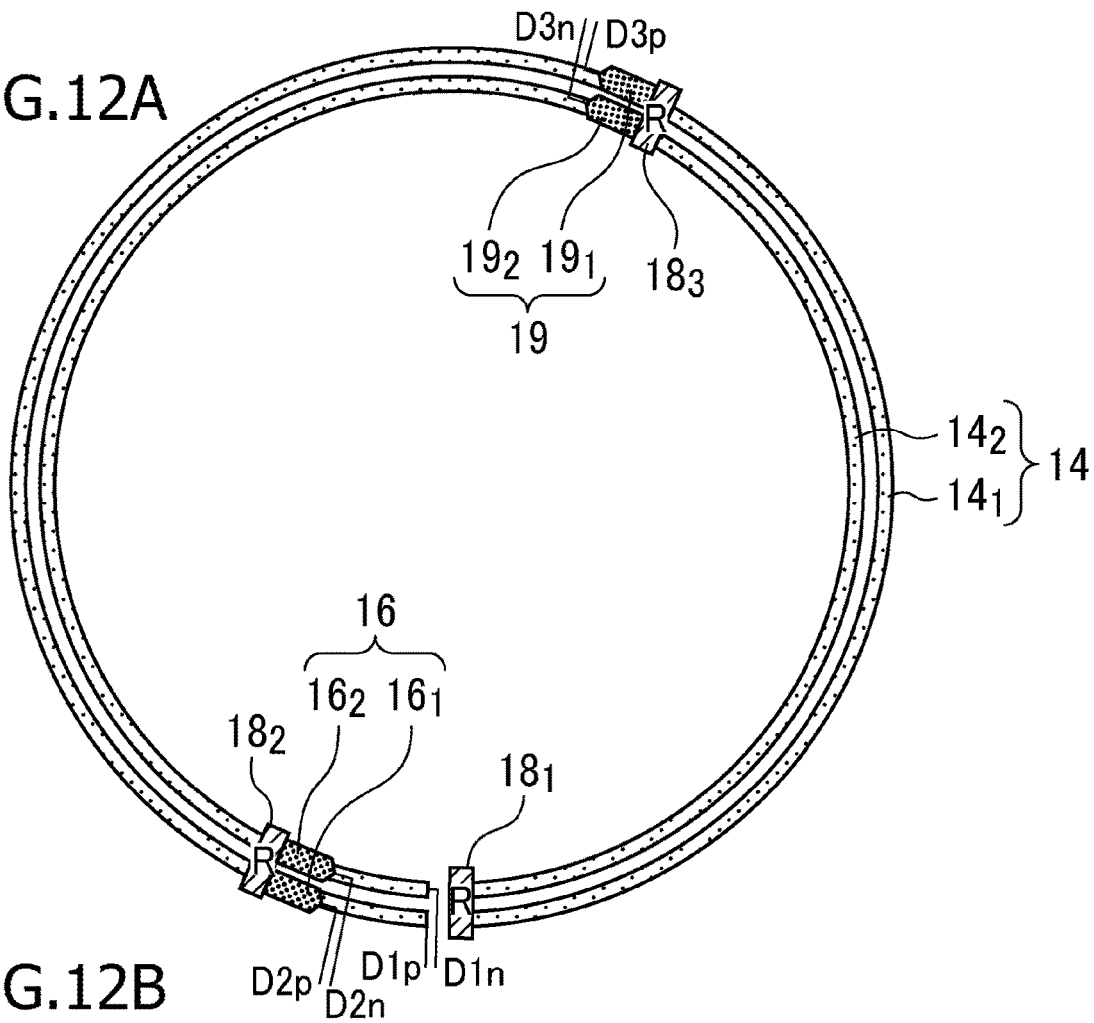
FIGS. 12A and 12B are diagrams illustrating the rotation information apparatus according to Example 4 of the present invention.
Figure 12B:
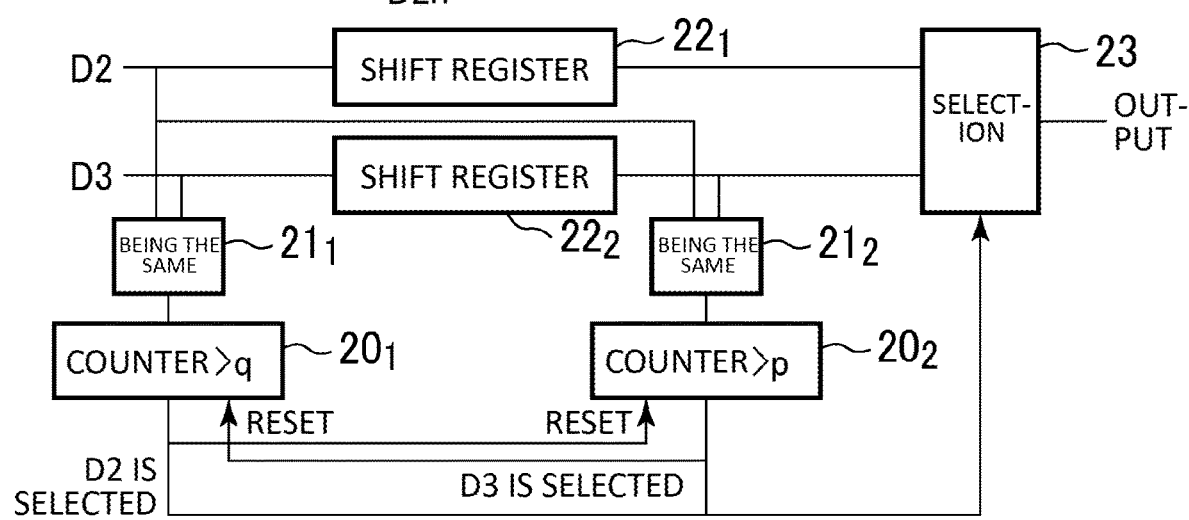

Next, the rotation information apparatus according to Example 4 of the present invention is described in reference to FIGS. 12A and 12B, where the locations of the couplers 16 and 19 in arc form are changed. FIG. 12A is a schematic diagram illustrating the structure, and FIG. 12B is a diagram illustrating the structure of a switching circuit for switching output signals. Here, the state of attachment of this rotation information apparatus is the same as in Example 1 that is described above. As illustrated in FIG. 12A, in Example 4 of the present invention, a coupler 14 in arc form is provided on a substrate (13) in the same manner as in Example 2, and at the same time, couplers 16 and 19 in arc form are provided on a substrate (15) in locations where coupling with the coupler 14 in arc form is possible. In this case, however, the couplers 16 and 19 in arc form are arranged at such a distance that the couplers 16 and 19 in arc form can receive different digital signals from the coupler 14 in arc form.

FIG. 12B is a diagram illustrating the structure of a switching circuit for switching output signals. A pair of counters $20_1$ and $20_2$, a pair of determination circuits $21_1$ and $21_2$, a pair of shift registers $22_1$ and $22_2$, and a selection circuit 23 are provided.

FIG. 12(b) is a diagram illustrating the structure of a switching circuit for switching output signals. A pair of counters $20_1$ and $20_2$, a pair of determination circuits $21_1$ and $21_2$, a pair of shift registers $22_1$ and $22_2$, and a selection circuit 23 are provided.

When the timing for switching is adjusted in this manner, the positional relationship between the couplers 16 and 19 in arc form becomes arbitrary.

Example 5

Figure 13A:
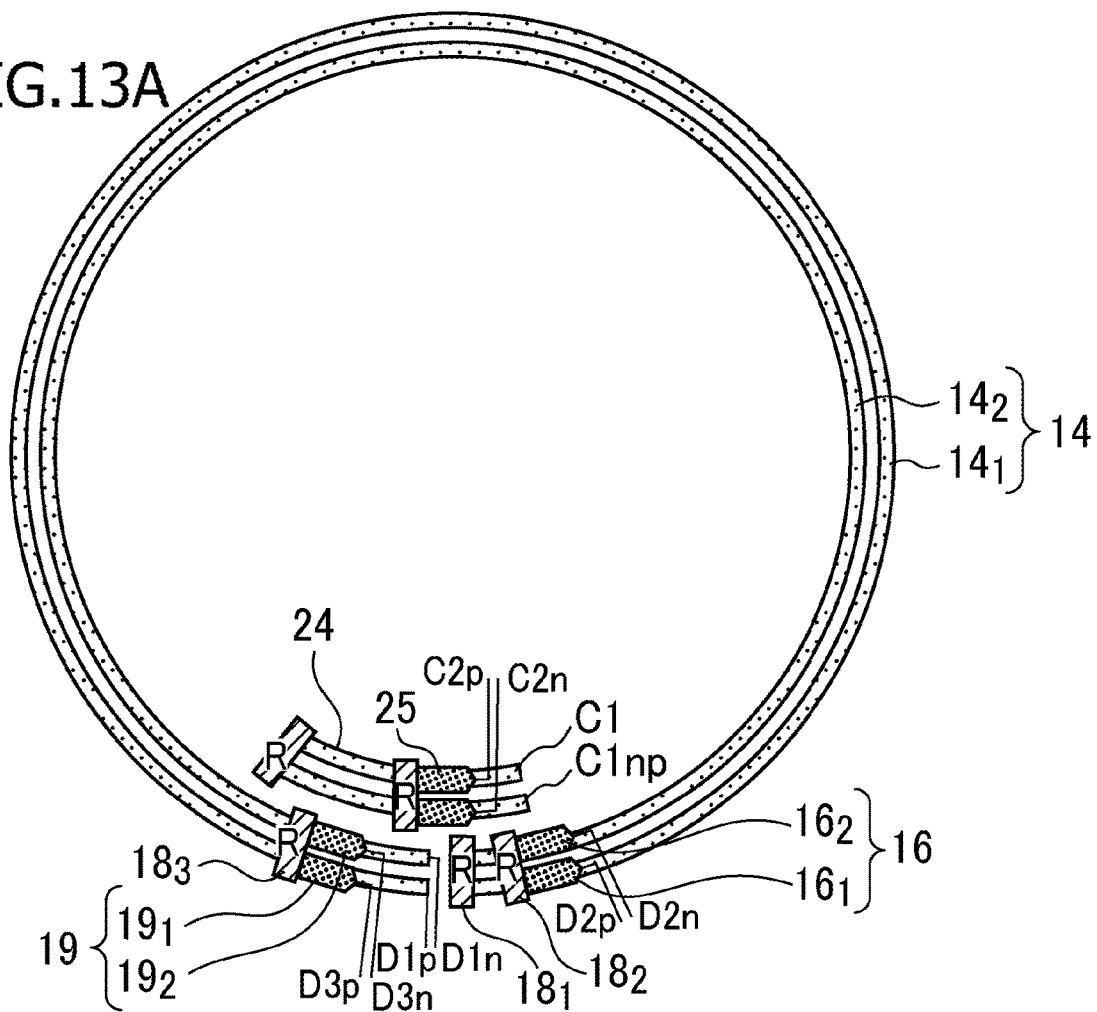
FIGS. 13A and 13B are diagrams illustrating the rotation information apparatus according to Example 5 of the present invention.
Figure 13B:
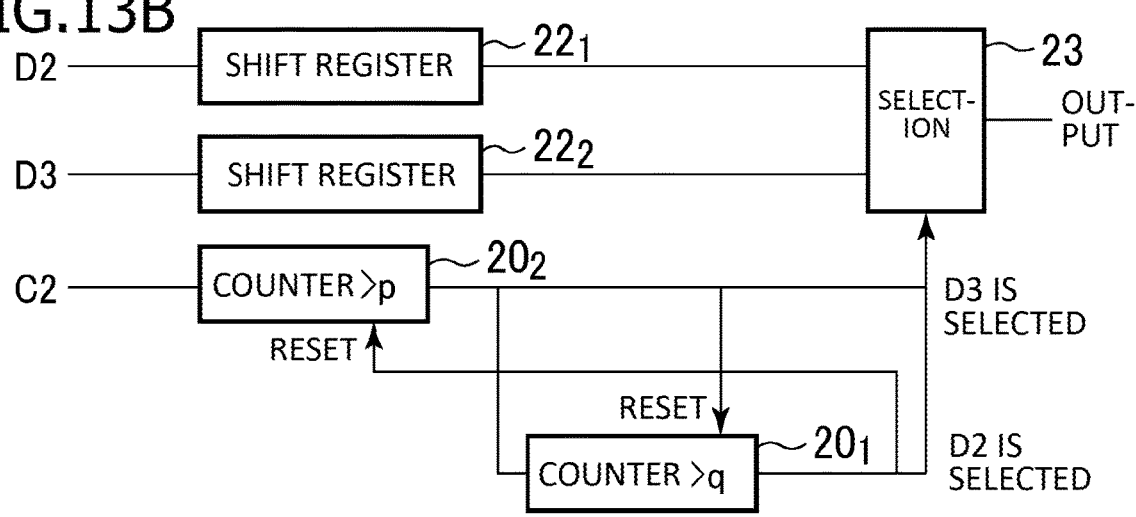
Figure 14:
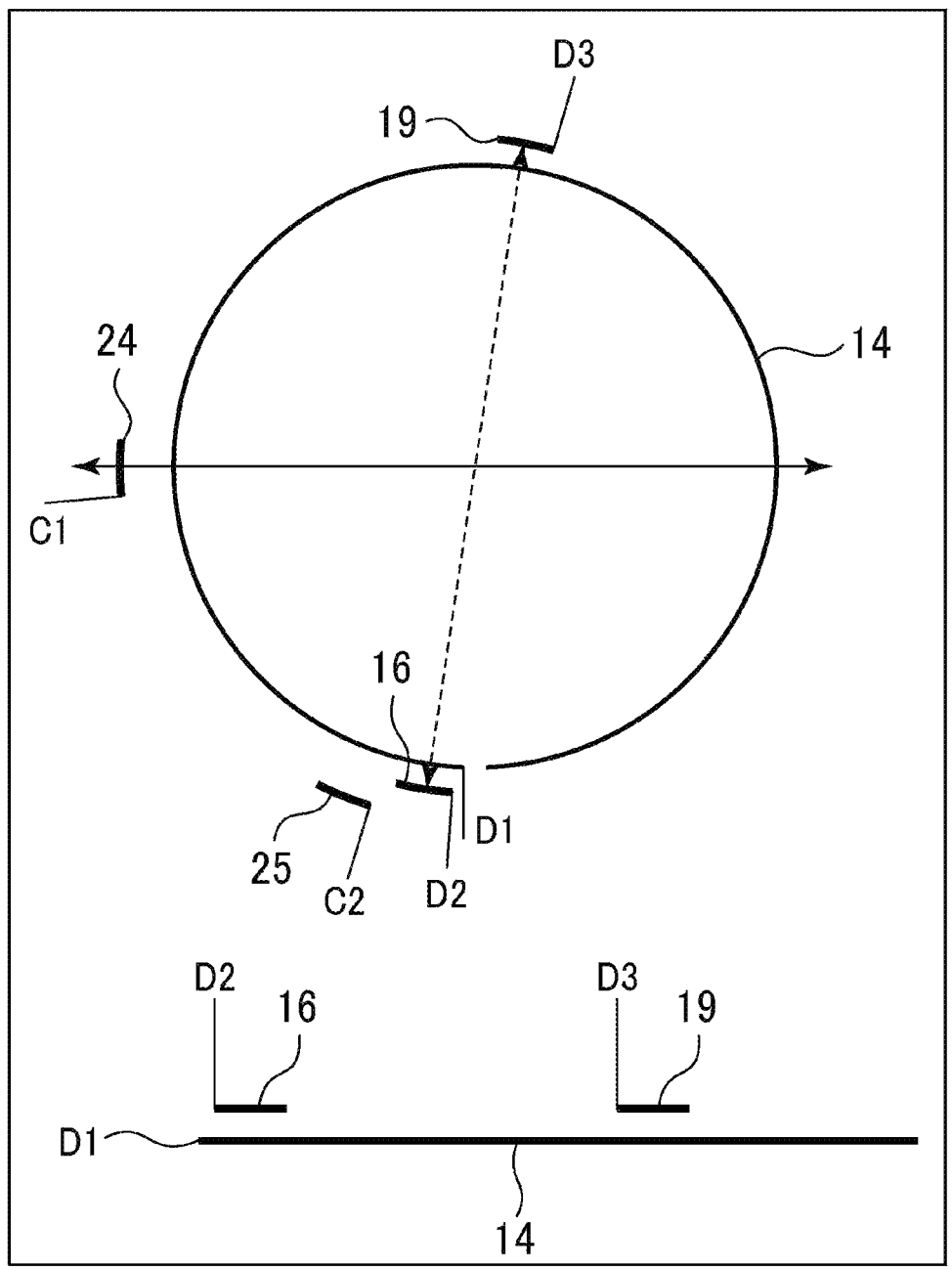
FIG. 14 is a diagram illustrating the switching of output signals in the rotation information apparatus according to Example 5 of the present invention.

Next, the rotation information apparatus according to Example 5 of the present invention is described in reference to FIGS. 13A through 14, where a coupler in arc form for a control signal is added to the configuration in Example 2 in order to determine the switching time. FIGS. 13A and 13B are diagrams illustrating the rotation information apparatus according to Example 5 of the present invention. FIG. 13A is a schematic diagram illustrating the structure, and FIG. 13B is a diagram illustrating the structure of a switching circuit for switching output signals. Here, the state of attachment of this rotation information apparatus is the same as in Example 1 that is described above. As illustrated in FIG. 13A, in Example 5 of the present invention, a coupler 14 in arc form is provided on a substrate (13) in the same manner as in Example 2, and at the same time, a coupler 24 in arc form for a control signal is provided. Meanwhile, couplers 16 and 19 in arc form having the same curvature radius as the coupler 14 in arc form are provided on a substrate (15) in locations where coupling with the coupler 14 in arc form is possible, and at the same time, a coupler 25 in arc form for a control signal that allows coupling with the coupler 24 in arc form for a control signal is provided. Though the couplers 24 and 25 in arc form for a control signal are provided inside the coupler 14 in arc form, they may be provided on the outside.

FIG. 13B is a diagram illustrating the structure of a switching circuit for switching output signals. A pair of counters $20_1$ and $20_2$, a pair of determination circuits $21_1$ and $21_2$, a pair of shift registers $22_1$ and $22_2$, and a selection circuit 23 are provided.

Next, switching of the output signals is described in reference to FIG. 14, where the respective couplers are denoted by symbols. The upper portion of the diagram is a schematic plan diagram, and the lower portion is an exploded diagram where the coupler 14 in arc form is extended in linear form. Here, the locations where the couplers 24 and 25 in arc form for a control signal are installed are different from those in FIG. 13A for the ease of description.

As the rotational member (12) rotates, the coupler 24 in arc form for a control signal couples with the coupler 25 in arc form for a control signal so as to detect a control signal, and then selects the outputs $D_{2p}$ and $D_{2n}$ from the coupler 16 in arc form as the outputs to the substrate (15) during a predetermined number of bits, and switches the outputs $D_{3p}$ and $D_{3n}$ from the coupler 19 in arc form to the outputs to the substrate (15) after the above-described number of bits have been counted. After that, at the point in time when the coupler 24 in arc form for a control signal again couples with the coupler 25 in arc form for a control signal so as to detect a control signal, the outputs $D_{2p}$ and $D_{2n}$ from the coupler 16 in arc form are again switched to the outputs to the substrate (15), which is repeated. As a result, the coupler 16 in arc form or the coupler 19 in arc form couples with the coupler 14 in arc form in the upper half of FIG. 14. In this case as well, there is a possibility that bit skipping might occur at the time of output switching, and countermeasures are necessary in the same manner as in Example 2.

Example 6

Figure 15A:
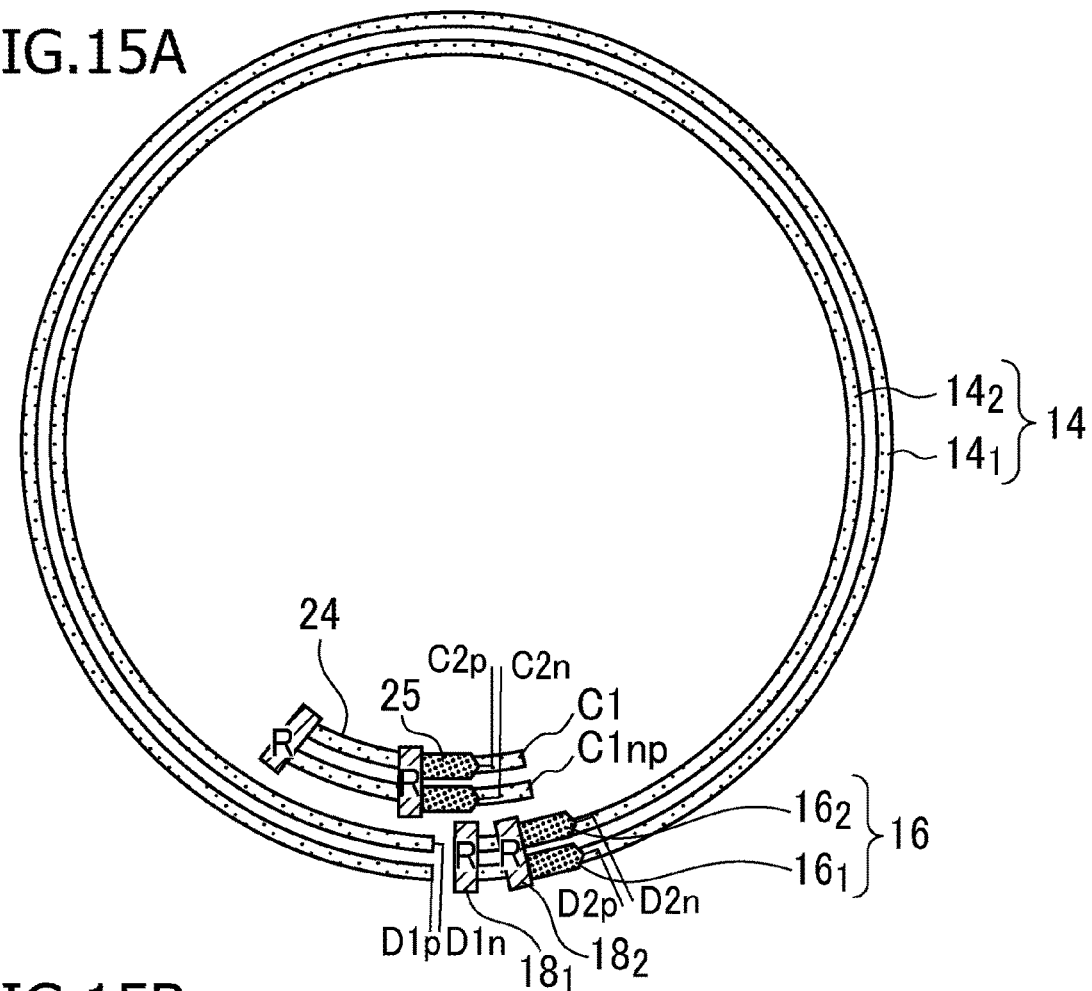
FIGS. 15A and 15B are diagrams illustrating the rotation information apparatus according to Example 6 of the present invention.
Figure 15B:
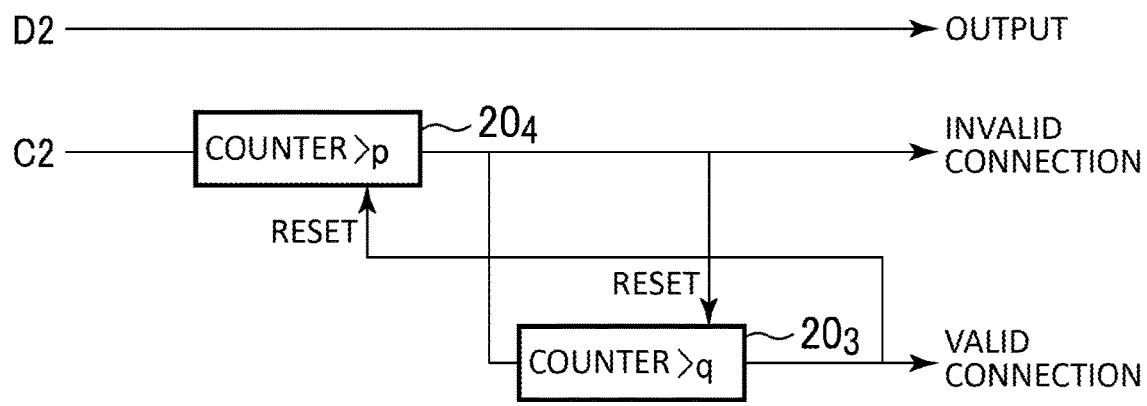

Next, the rotation information apparatus according to Example 6 of the present invention is described in reference to FIGS. 15A and 15B, where a coupler in arc form for a control signal is added to the structure in Example 1 in order to perceive an angle at which the couplers 14 and 16 in arc form cannot be coupled with each other. FIGS. 15A and 15B are diagrams illustrating the rotation information apparatus according to Example 6 of the present invention. FIG. 15A is a schematic diagram illustrating the structure, and FIG. 15B is a diagram illustrating the structure of a switching circuit for switching output signals. Here, the state of attachment of this rotation information apparatus is the same as in Example 1 that is described above. As illustrated in FIG. 15A, in Example 6 of the present invention, a coupler 14 in arc form is provided on a substrate (13) in the same manner as in Example 1, and at the same time, a coupler 24 in arc form for a control signal is provided. Meanwhile, a coupler 16 in arc form having the same curvature radius as the coupler 14 in arc form is provided on a substrate (15) in a location where coupling with the coupler 14 in arc form is possible, and at the same time, a coupler 25 in arc form for a control signal that allows coupling with the coupler 24 in arc form for a control signal is provided. Though the couplers 24 and 25 in arc form for a control signal are provided inside the coupler 14 in arc form, they may be provided on the outside.

FIG. 15B is a diagram illustrating the structure of a switching circuit for switching output signals. A pair of counters $20_3$ and $20_4$ are provided. As the rotational member (12) rotates, the coupler 24 in arc form for a control signal couples with the coupler 25 in arc form for a control signal so as to measure the number of pulses of the control signals outputted from $C_2$ by using the counter $20_4$. When the detected number of signals is p or greater, it is determined that the connection is invalid, and the counter $20_3$ is reset. When the control signal is detected q or more times by using the counter $20_3$ afterwards, it is determined that the connection is valid, and the counter $20_4$ is reset. By doing so, an angle at which the couplers 14 and 16 in arc form cannot be coupled with each other can be perceived.

Thus, in Example 6 of the present invention, a coupler in arc form for a control signal is provided so as to perceive an angle at which the couplers 14 and 16 in arc form cannot be coupled with each other, and thus, a signal at an angle at which interference between signals occurs is discarded, and therefore, only signals that do not cause interference between symbols can be used.

Example 7

Figure 16A:
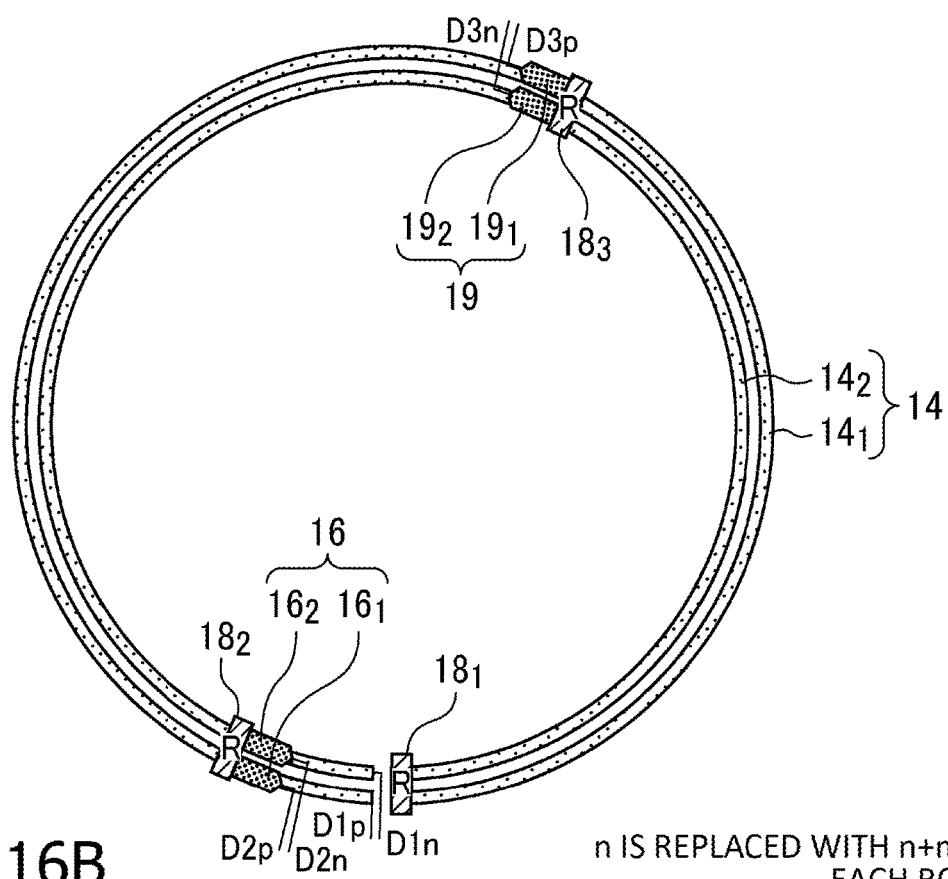
FIGS. 16A and 16B are diagrams illustrating the rotation information apparatus according to Example 7 of the present invention.

Next, the rotation information apparatus according to Example 7 of the present invention is described in reference to FIGS. 16A through 21B, where the rotation information apparatus is the same as in Example 4 that is described above, except that the output control method is different. FIGS. 16A and 16B are diagrams illustrating the rotation information apparatus according to Example 4 of the present invention. FIG. 16A is a schematic diagram illustrating the structure, and FIG. 16B is a diagram illustrating the structure of a switching circuit for switching output signals. Here, the state of attachment of this rotation information apparatus is the same as in Example 1 that is described above. As illustrated in FIG. 16A, a coupler 14 in arc form is provided on a substrate (13) in the same manner as in Example 4 of the present invention, and at the same time, couplers 16 and 19 in arc form are provided on a substrate (15) in locations where coupling with the coupler 14 in arc form is possible. In this case, the couplers 16 and 19 in arc form are arranged at such a distance where the couplers 16 and 19 in arc form can receive different digital signals from the coupler 14 in arc form.

Figure 16B:
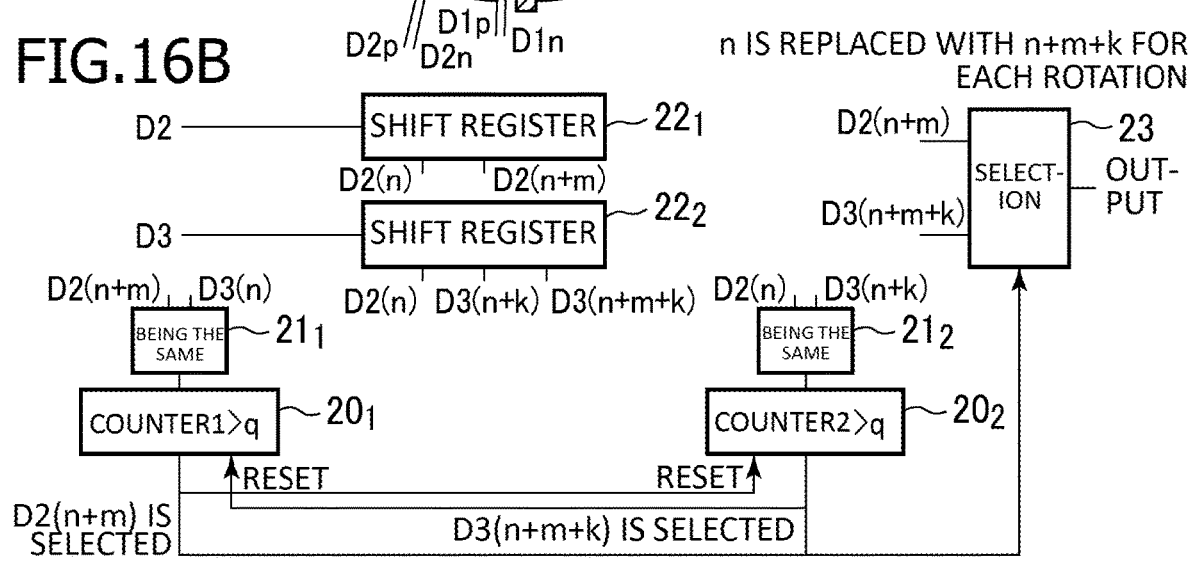

FIG. 16B is a diagram illustrating the structure of a switching circuit for switching output signals. A pair of counters $20_1$ and $20_2$, a pair of determination circuits $21_1$ and $21_2$, a pair of shift registers $22_1$ and $22_2$, and a selection circuit 23 are provided. In this case, every time the rotational member (12) rotates once, the data of $bit_n$ is replaced with $bit_{n+m+k}$.

Figure 17A:
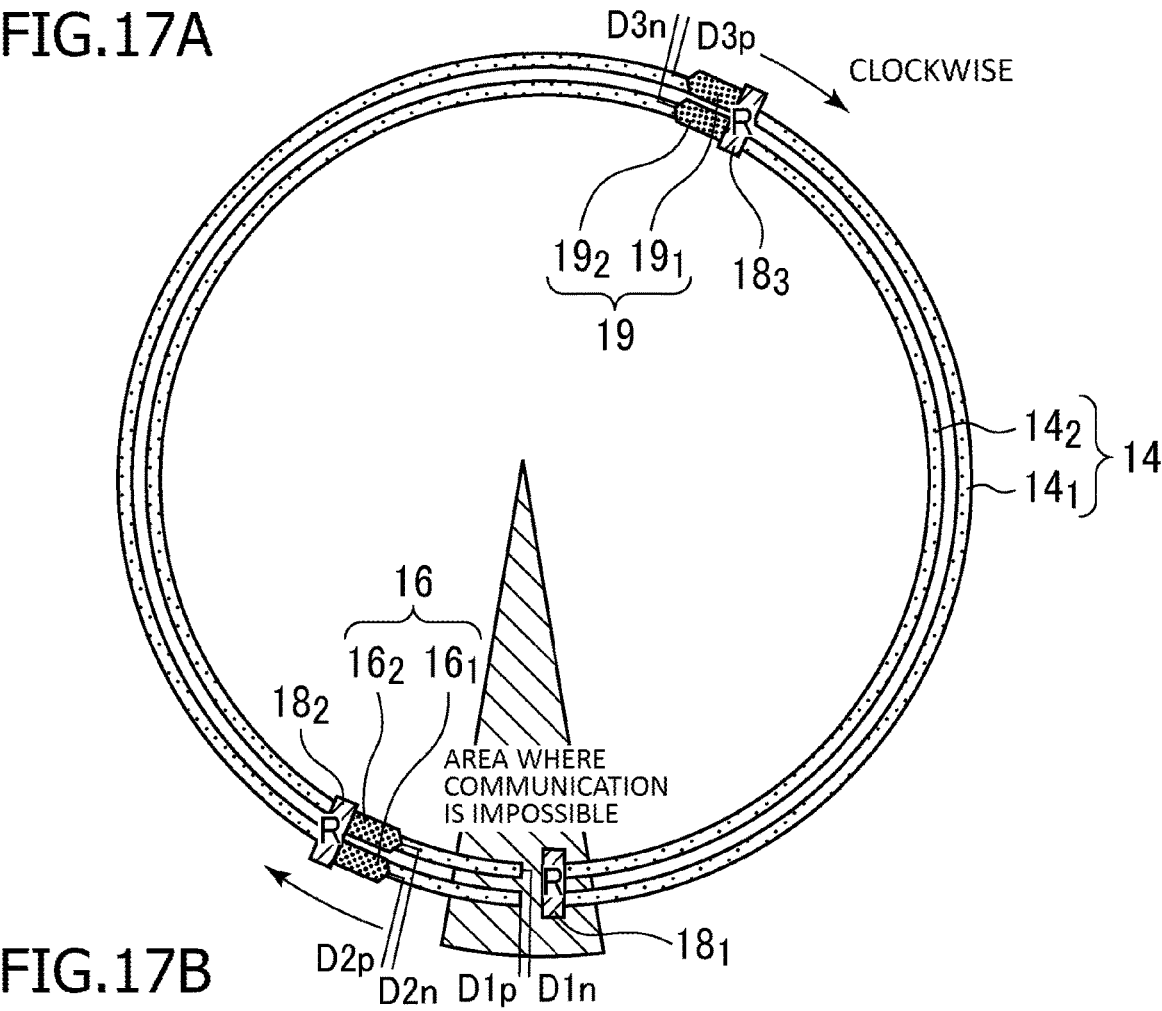
FIGS. 17A and 17B are diagrams illustrating state 1 and an output signal in the rotation information apparatus according to Example 7 of the present invention.
Figure 17B:
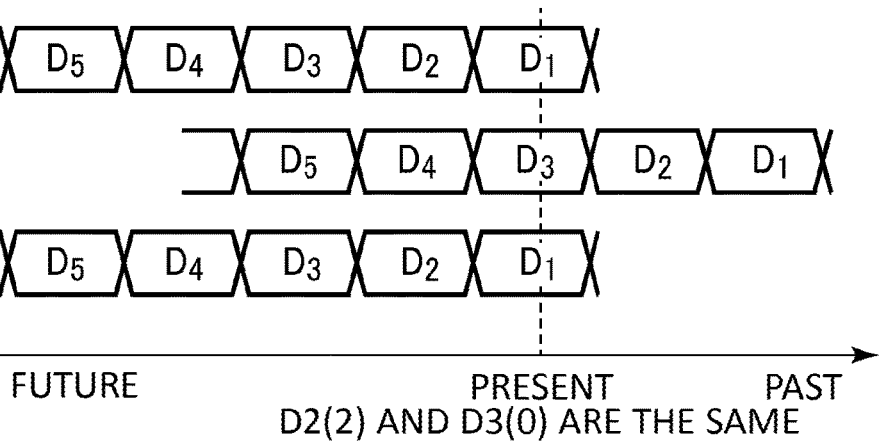

In the case where the couplers 16 and 19 in arc form are in such locations where normal communication with the coupler 14 in arc form is possible as illustrated in FIG. 17A, the output $D_2$ (n+m) from the shift register $22_1$ and the output $D_2$ (n) from the shift register $22_2$ are the same as illustrated in FIG. 17B. Here, it is adjusted at the time of installment that the outputs from the couplers 16 and 19 in arc form are shifted by two bits, and therefore, m=2 and n=0. Here, in order to avoid the outputs from being the same by accident, it is determined in the determination circuit $21_2$ that the outputs become the same in a predetermined number q times or more, and after that, the output to the substrate (15) is switched to $D_2$ (n+m) and the counter $20_2$ is reset.

Figure 18A:
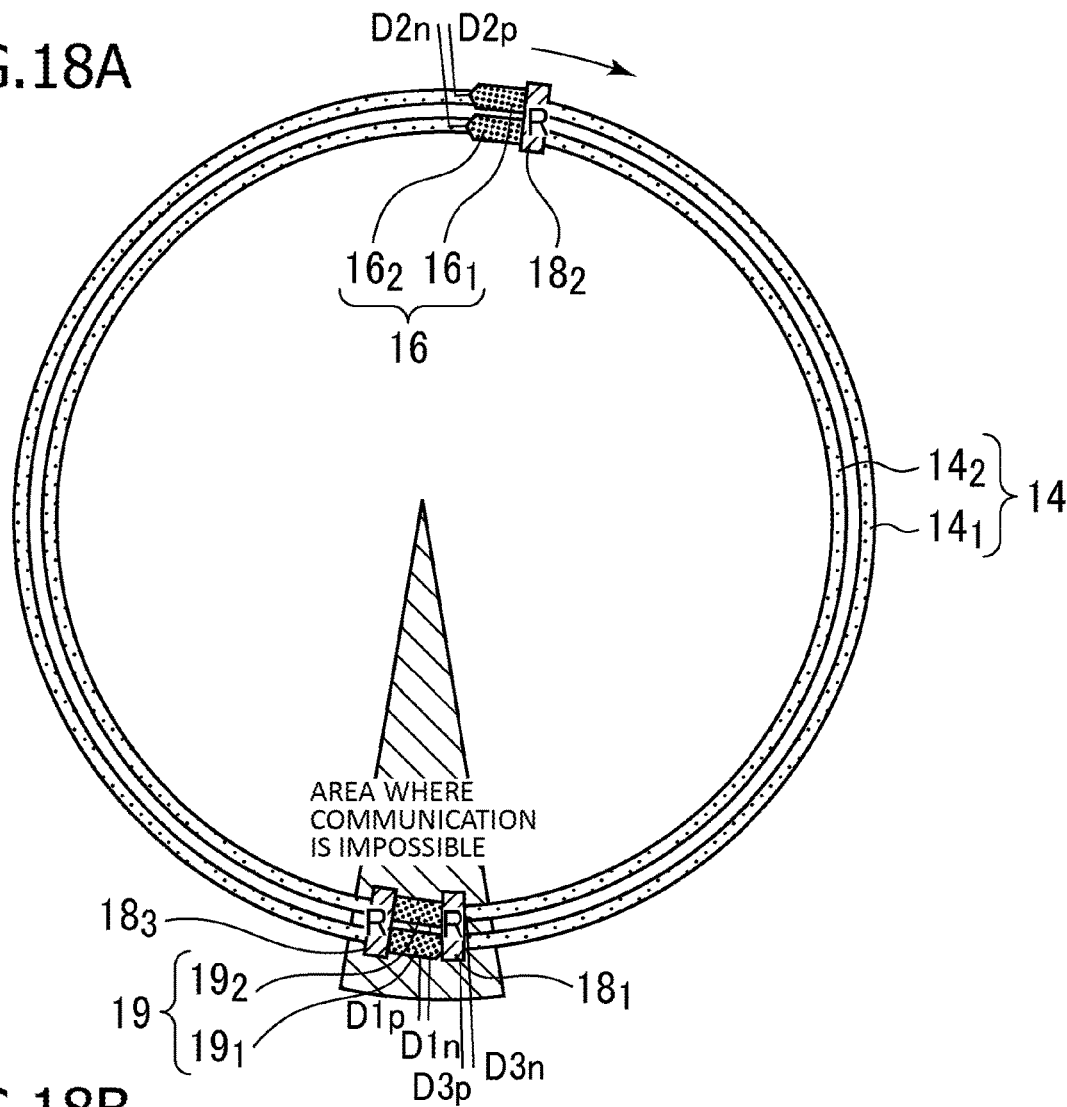
FIGS. 18A and 18B are diagrams illustrating state 2 and an output signal in the rotation information apparatus according to Example 7 of the present invention.
Figure 18B:
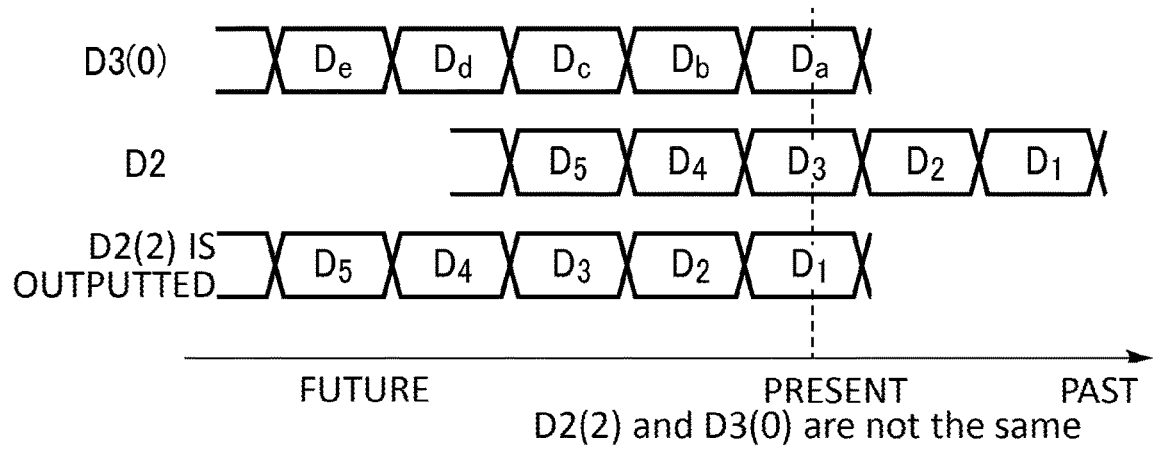

Next, as illustrated in FIG. 18A, in the case where the rotational member rotates by half, the coupler 19 in arc form cannot communicate correctly, though the coupler 16 in arc form can communicate correctly. In this case, as illustrated in FIG. 18B, $D_2$ (n+m=2) and $D_3$ (n=0) are not the same, and therefore, $D_2$ (n+m=2) is made to be the output to the substrate (15) as it is.

Figure 19A:
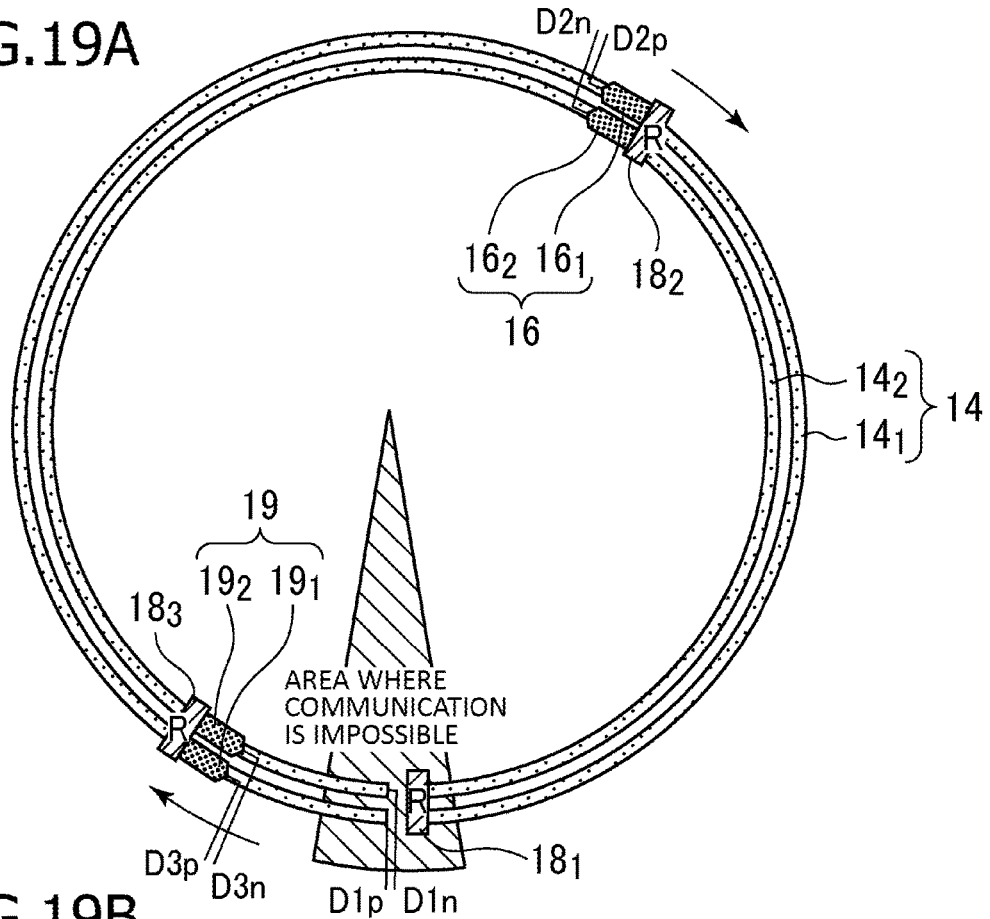
FIGS. 19A and 19B are diagrams illustrating state 3 and an output signal in the rotation information apparatus according to Example 7 of the present invention.
Figure 19B:
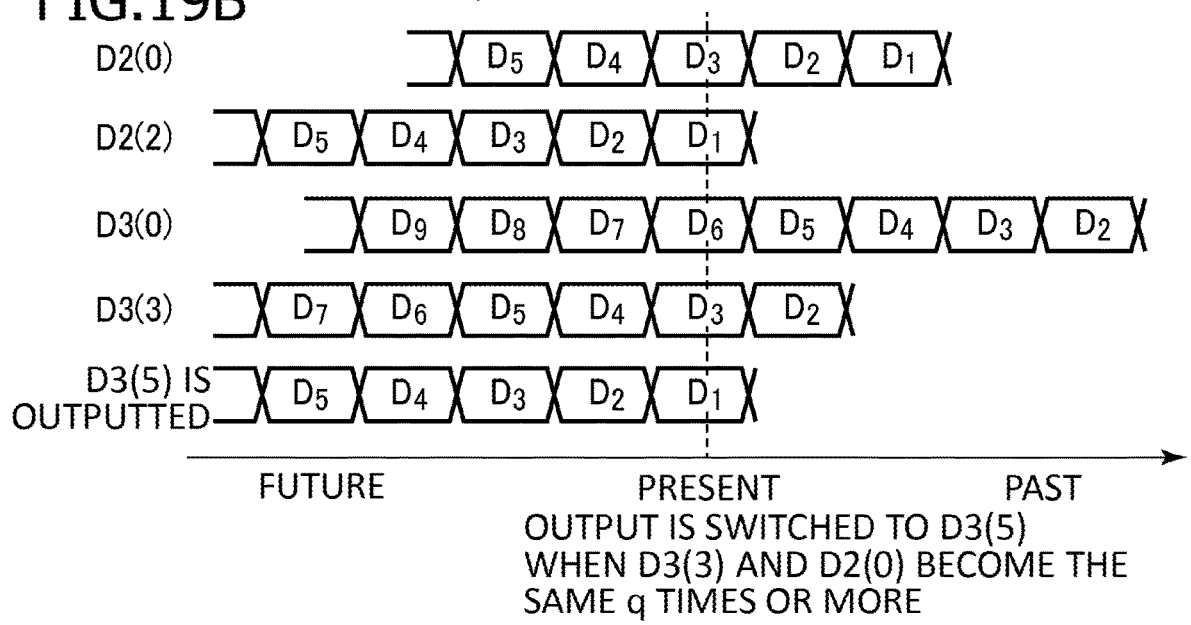

Next, when the rotational member rotates further so that both the couplers 16 and 19 in arc form can communicate correctly as illustrated in FIG. 19A, $D_3$ (n+k=3) and $D_2$ (n=0) become the same as illustrated in FIG. 19B (in the case of this figure, k=3 and n=0). In this case as well, in order to avoid the outputs from becoming the same by accident, it is determined in the determination circuit $21_1$ that the outputs become the same a predetermined q times or more, and after that, the output to the substrate (15) is switched to $D_3$ (k+m+n=5) and the counter $20_1$ is reset.

Figure 20A:
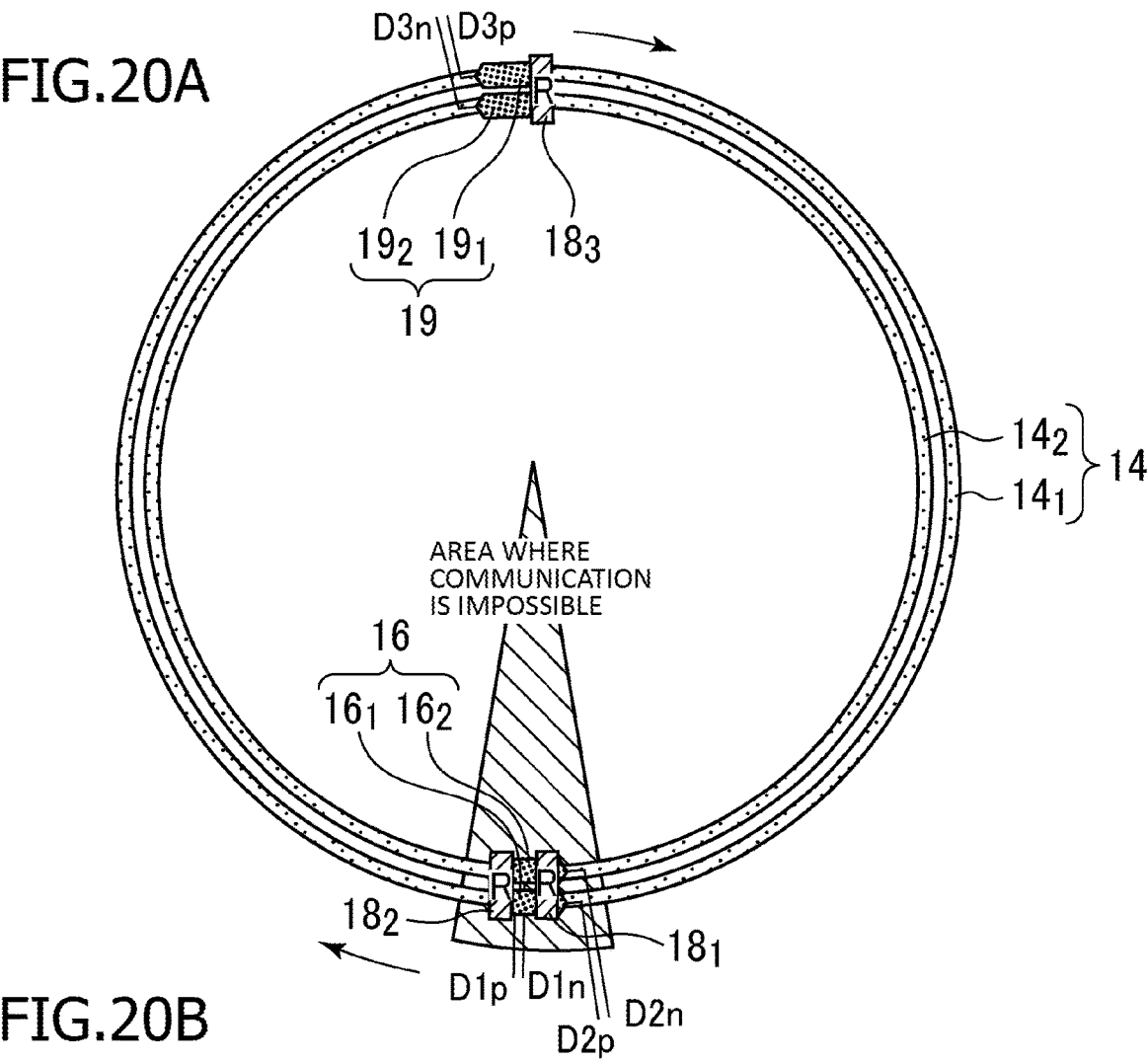
FIGS. 20A and 20B are diagrams illustrating state 4 and an output signal in the rotation information apparatus according to Example 7 of the present invention.
Figure 20B:
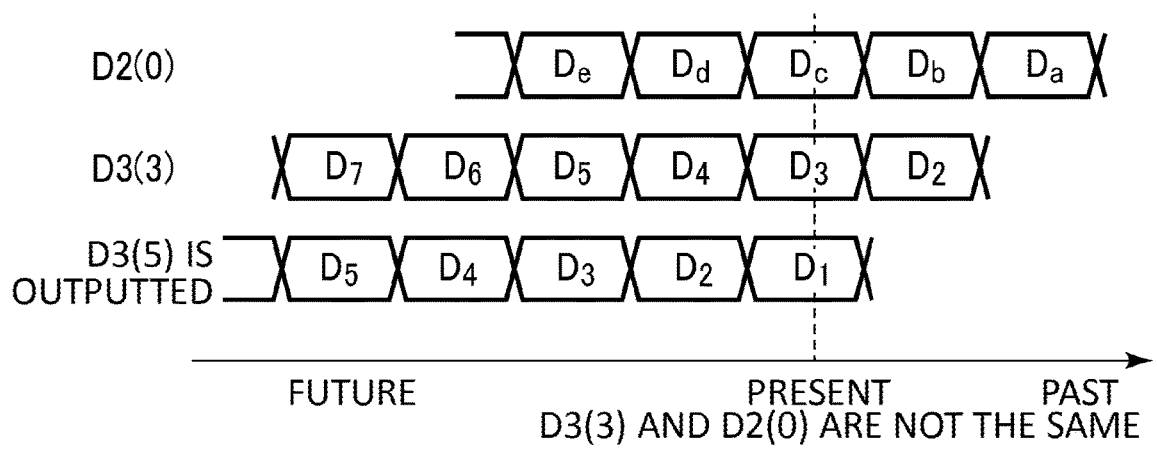

Next, as illustrated in FIG. 20A, in the case where the rotational member further rotates approximately by half, the coupler 16 in arc form cannot communicate correctly though the coupler 19 in arc form can communicate correctly. In this case, as illustrated in FIG. 20B, $D_3$ (n+k=3) and $D_2$ (n=0) are not the same, and therefore, $D_3$ (k+m+n=5) is made to be the output to the substrate (15) at it is.

Figure 21A:
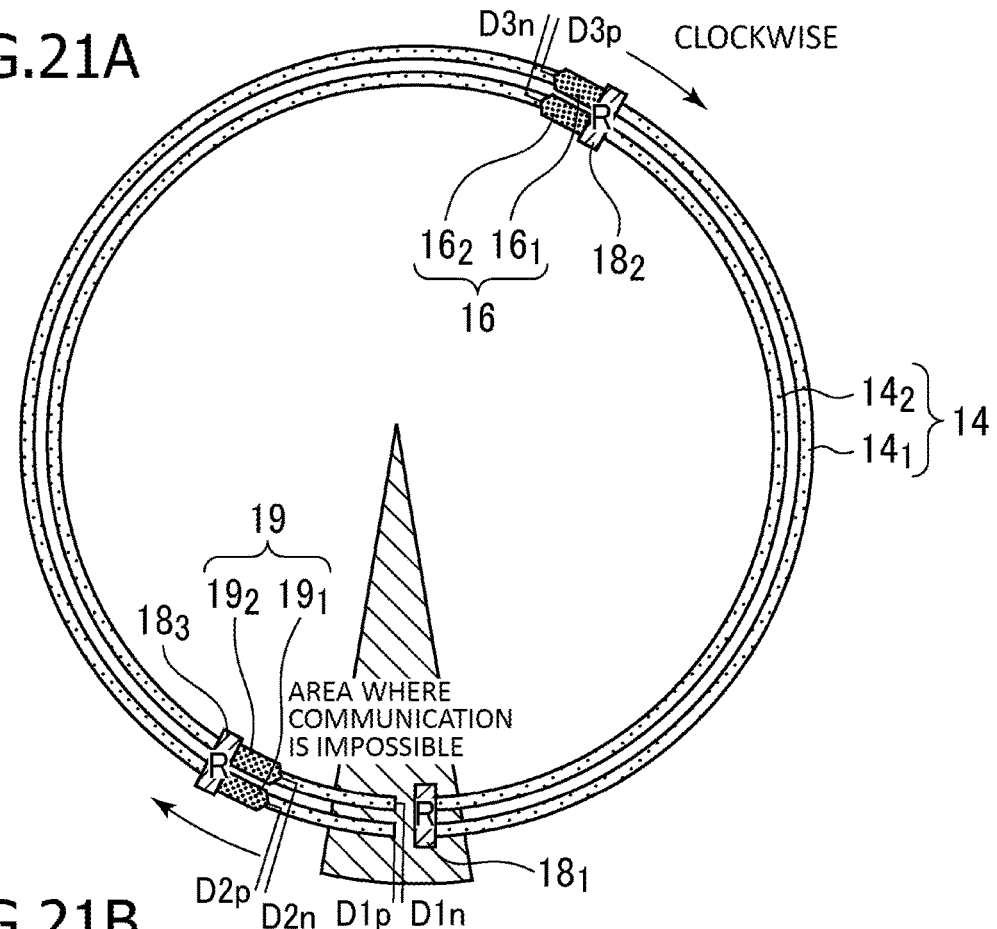
FIGS. 21A and 21B are diagrams illustrating state 5 and an output signal in the rotation information apparatus according to Example 7 of the present invention.
Figure 21B:
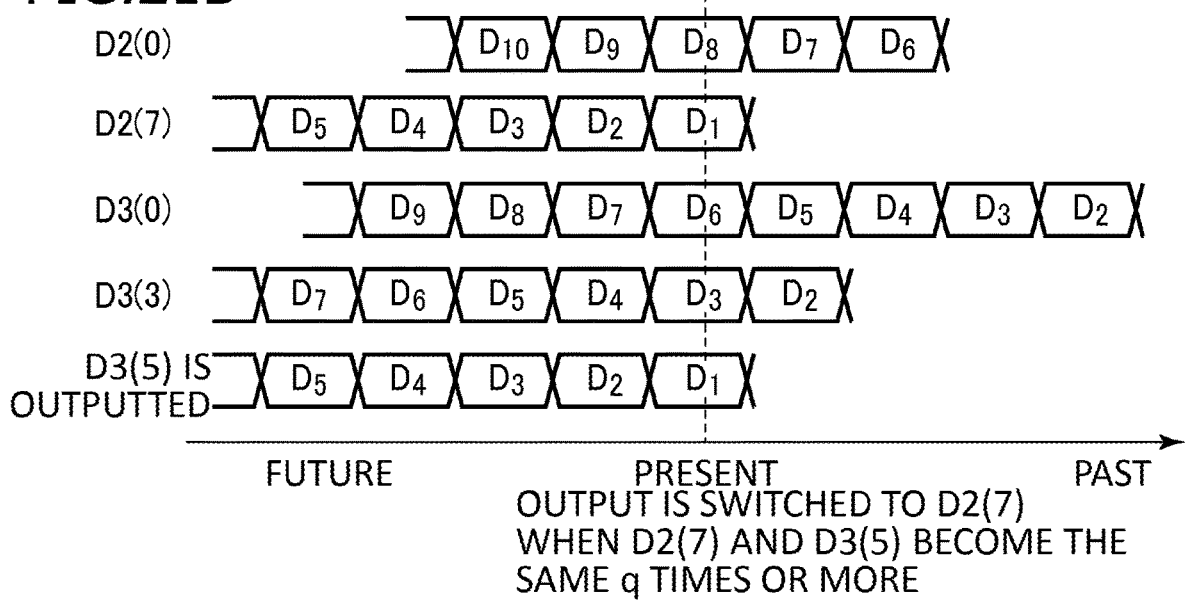

Next, the rotational member further rotates so that both the couplers 16 and 19 in arc form can communicate correctly as illustrated in FIG. 21A, $D_2$ (n+m=7) and $D_3$ (n=5) become the same as illustrated in FIG. 21B (in the case of this figure, m=2, k=3 and n=5). In this case as well, in order to avoid the outputs from becoming the same by accident, it is determined in the determination circuit $21_2$ that the outputs become the same a predetermined q times or more, and after that, the outputs to the substrate (15) is switched to $D_2$ (n+m=7) and the counter $20_2$ is reset.

In this manner, every time the rotational member rotates once, the $bit_n$ is updated to the $bit_{n+m+k}$ in Example 7 of the present invention, and therefore, n+m bits are discarded before the shift registers $22_1$ and $22_2$ overflow, and thus, the system is reset. As a result, wireless communication of data of several Gbps becomes possible in a rotation information apparatus without causing interference between symbols and without miniaturizing the couplers to such an extent that installation becomes difficult.

Example 8

Next, the rotation information apparatus according to Example 8 of the present invention is described in reference to FIGS. 22A and 22B, where the rotation information apparatus is the same as in Example 7 that is described above, except that the direction in which the rotational member rotates is reversed. FIGS. 22A and 22B are diagrams illustrating the rotation information apparatus according to Example 8 of the present invention. FIG. 22A illustrates the same case of transition from FIG. 19A to FIG. 20A. In addition, FIG. 22B illustrates the same case of transition from FIG. 17A to FIG. 18A.

In this manner, it can be seen that data communication is possible even when the direction of rotation in Example 7 is reversed. Accordingly, the direction of rotation of a surveillance camera can be freely switched between clockwise and counterclockwise, and thus, in exactly the same manner as in Example 7, wireless communication of data of several Gbps becomes possible in the rotation information apparatus without causing interference between symbols and without miniaturizing the couplers to such an extent that installation becomes difficult.

Example 9

Figure 23:
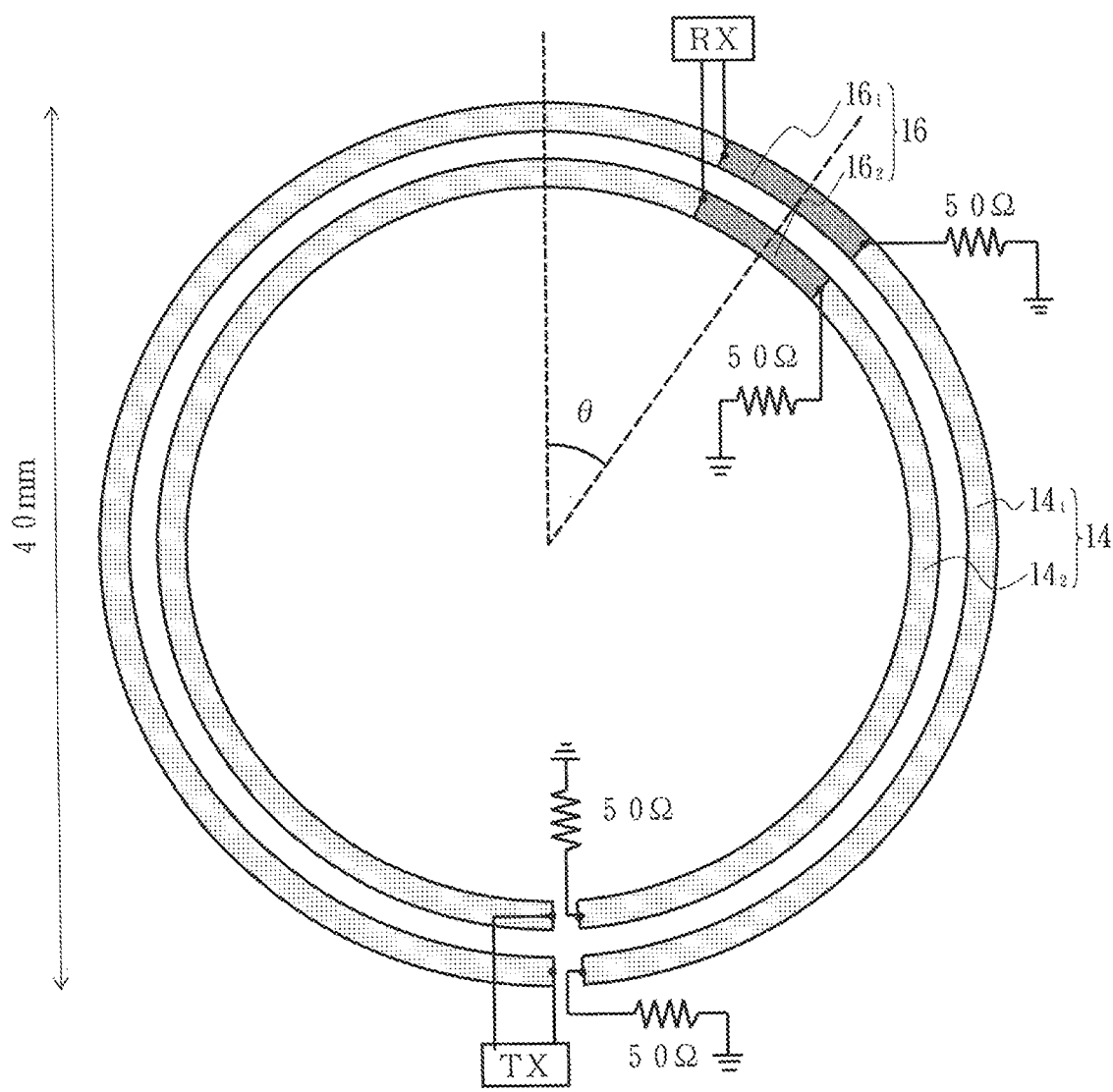
FIG. 23 is a diagram illustrating a concrete configuration of one embodiment of the rotation information apparatus according to Example 9 of the present invention.

Next, the rotation information apparatus according to Example 9 of the present invention is described in reference to FIGS. 23 through 26B. This is a simulation of the characteristics of one embodiment in the above-described invention in Example 1. FIG. 23 is a diagram illustrating a concrete configuration of one embodiment of the rotation information apparatus according to Example 9 of the present invention, where simulation is carried out by setting the outer diameter to 40 mm. Here, a signal is sent from one end portion TX of a coupler 14 in arc form and received by one end portion RX of a coupler 16 in arc form of which the length of the arc is short. In addition, the other end portion of the coupler 14 in arc form is grounded through a resistor of 50Ω, and the other end portion of the coupler 16 in arc form is also ground through a resistor of 50Ω.

Figure 24:
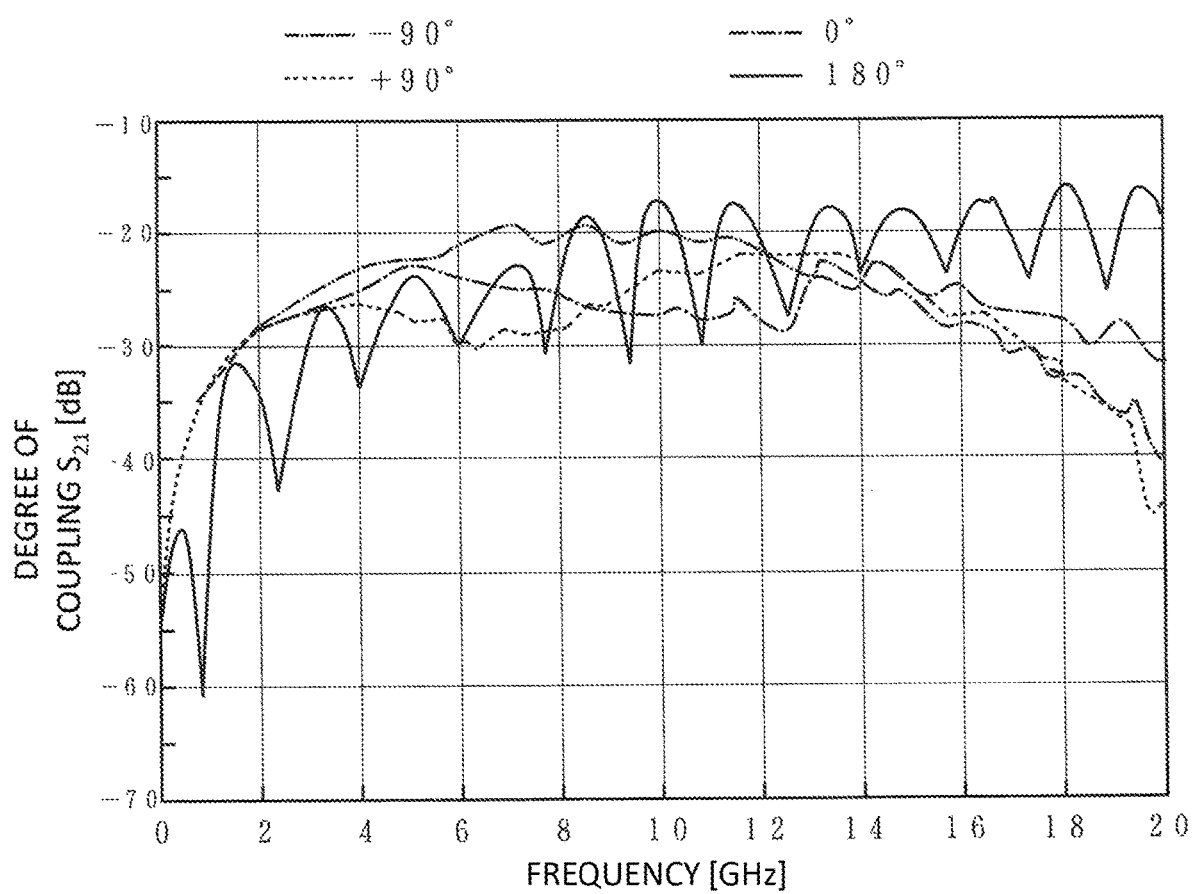
FIG. 24 is a graph illustrating the dependency of the degree of coupling—the frequency characteristics on the location of the receiver in the rotation information apparatus according to Example 9 of the present invention.

FIG. 24 is a graph illustrating the dependency of the degree of coupling-the frequency characteristics on the location of the receiver in the rotation information apparatus according to Example 9 of the present invention. Here, the location 180° from one end portion of the coupler 14 in arc form from which a signal is to be sent is set as the original point, and the angle up to the center point of the coupler 16 in arc form is θ. As is clear from FIG. 24, the band is narrow when θ=180°; however, it is confirmed that broadband characteristics can be gained at other angles. Here, the communication distance, that is to say, the distance between the couplers 14 and 16 in arc form is 1 mm.

Figure 25A:
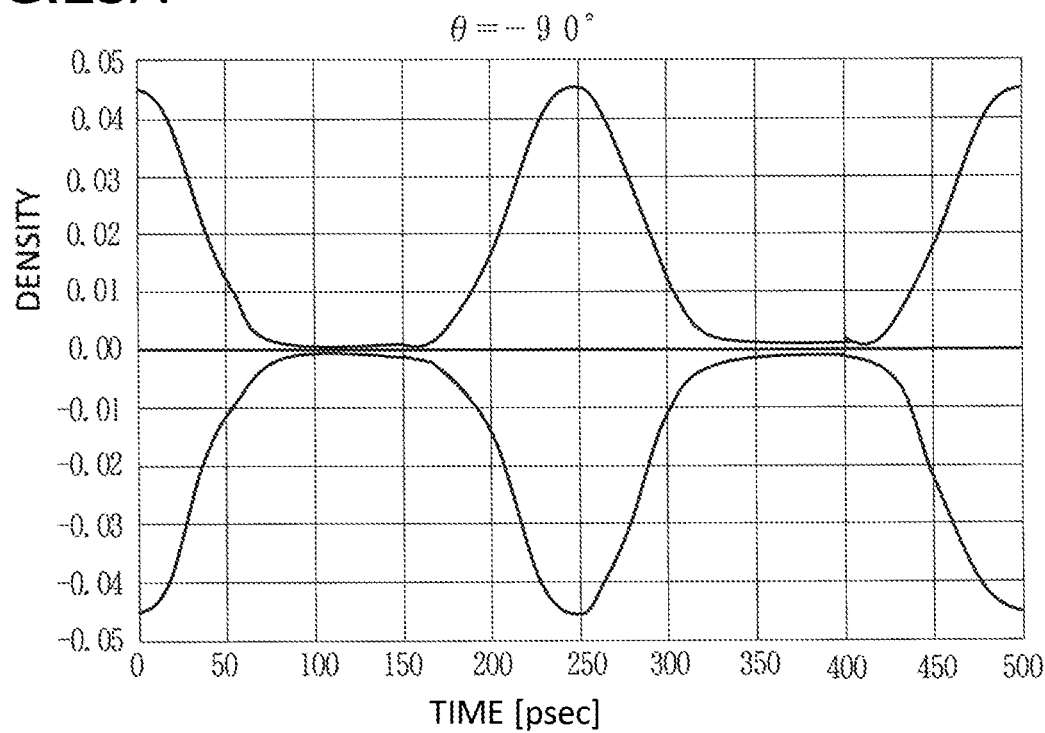
FIGS. 25A and 25B are graphs illustrating the dependency of the eye pattern (1) on the location of the receiver in the rotation information apparatus according to Example 9 of the present invention.
Figure 25B:
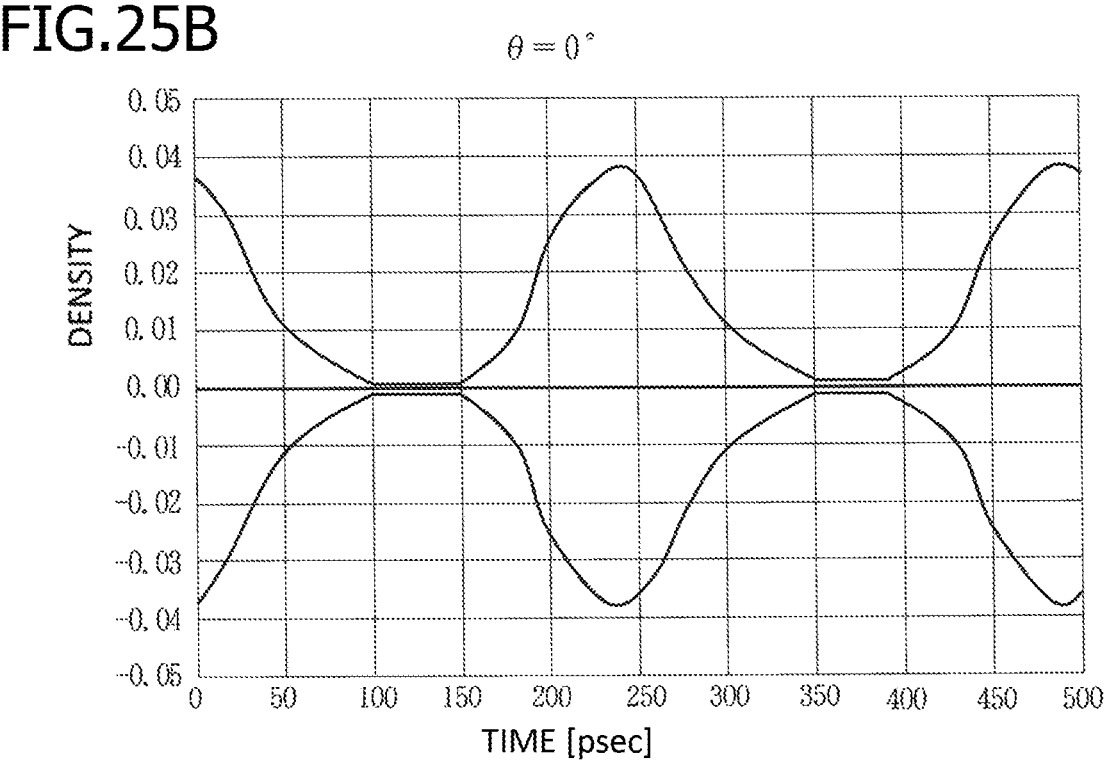

FIGS. 25A and 25B are graphs illustrating the dependency of the eye pattern (1) on the location of the receiver in the rotation information apparatus according to Example 9 of the present invention. Here, the communication speed is set to 4 Gbps, and the input amplitude is set to 1.2 $V_{diff}$. In the case of θ=−90° illustrated in FIG. 25A and the case θ=0° illustrated in FIG. 25B, a plurality of waveforms overlaps to exhibit good characteristics where the eye pattern opens.

Figure 26A:
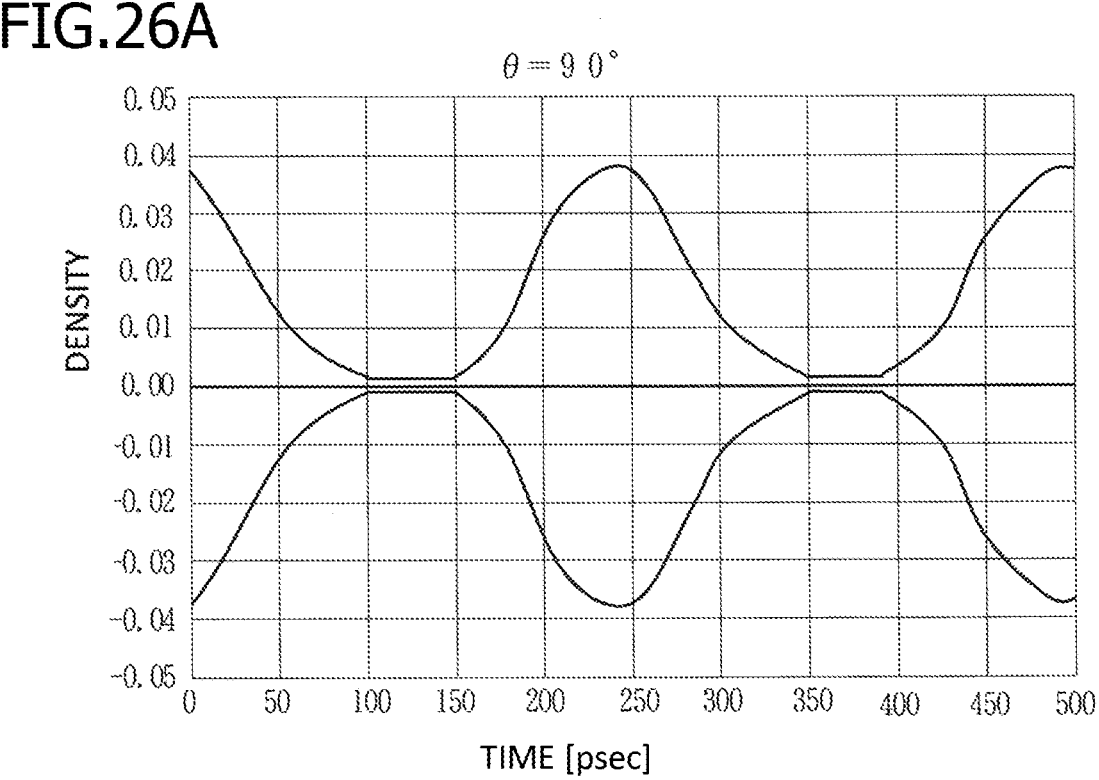
FIGS. 26A and 26B are graphs illustrating the dependency of the eye pattern (2) on the location of the receiver in the rotation information apparatus according to Example 9 of the present invention.
Figure 26B:
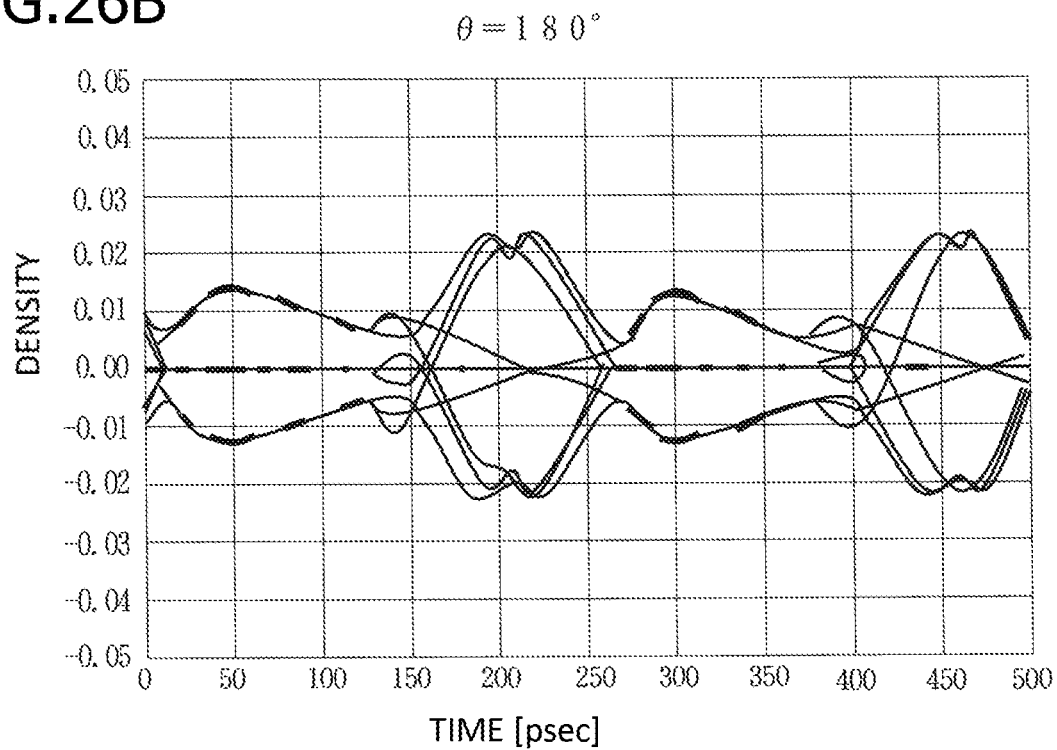

FIGS. 26A and 26B are graphs illustrating the dependency of the eye pattern (2) on the location of the receiver in the rotation information apparatus according to Example 9 of the present invention. In the case of θ=90° illustrated in FIG. 26A, good characteristics where the eye pattern opens are exhibited. In the case of θ=180° illustrated in FIG. 26B, however, a plurality of waveforms does not overlap appropriately, and a state where the eye pattern opens is not achieved.

It becomes clear from the above description that good communication characteristics can be gained in the cases other than where the coupler 16 in arc form is in close proximity to the other end of the coupler 14 in arc form.

REFERENCE SIGNS LIST 1 rotational axis
2 rotational member
3 first substrate
4 first coupler in arc form
$4_1$ signal line
$4_2$ feedback path
5 second substrate
6 second coupler in arc form
$6_1$ signal line
$6_2$ feedback path
7 fixture portion
$8_1$, $8_2$ connection portion
11 rotational axis
12 rotational member
13 substrate
14 coupler in arc form
$14_1$ signal line
$14_2$ feedback path
15 substrate
16 coupler in arc form
$16_1$ signal line
$16_2$ feedback path
17 ceiling
$18_1$, $18_2$, $18_3$ terminal resistor
$18_5$, $18_6$ short-circuiting conductor
19 coupler in arc form
$19_1$ signal line
$19_2$ feedback path
$20_1$, $20_2$, $20_3$, $20_4$ counter
$21_1$, $21_2$ determination circuit
$22_1$, $22_2$ shift register
23 selection circuit
24, 25 coupler in arc form for control signal

The invention claimed is:

1. A rotation information transmission apparatus, comprising:
    a first substrate where a first coupler in arc form is provided in an upper portion or a lower portion; and
    a second substrate comprising a second coupler in arc form that is arranged in a location where coupling with the first coupler in arc form is possible and a third coupler in arc form, wherein
    the first coupler in arc form is a single coupler in arc form comprising a signal line in arc form and a feedback path in arc form where one end of the signal line and one end of the feedback path are connected to each other through a terminal resistor or a short-circuiting conductor,
    length of the arc of the second coupler in arc form and the third coupler in arc form is shorter than length of the arc of the first coupler in arc form,
    at least either the second coupler in arc form or the third coupler in arc form always couples with the first coupler in arc form,
    either one of the first substrate or the second substrate is fixed to a non-movable portion, and
    the other one of the first substrate or the second substrate is fixed to a rotational member so as to be rotatable.

2. The rotation information transmission apparatus according to claim 1, wherein the first coupler in arc form is provided at the bottom of the first substrate.

3. The rotation information transmission apparatus according to claim 1, wherein
    the first coupler in arc form is provided on an outer peripheral surface of the first substrate, and
    the second coupler in arc form and the third coupler in arc form are provided along an inner peripheral surface of a cylindrical hollow portion provided in the second substrate.

4. The rotation information transmission apparatus according to claim 1, wherein
    the second coupler in arc form and the third coupler in arc form are arranged at a distance where the same digital signal from the first coupler in arc form can be received, and
    the rotation information transmission apparatus further comprises a switch for switching the output from the second coupler in arc form and the output from the third coupler in arc form.

5. The rotation information transmission apparatus according to claim 4, wherein
    the first substrate further comprises a first coupler for a control signal,
    the second substrate comprises a second coupler for a control signal in a location where coupling with the first coupler for a control signal is possible while the first substrate rotates, and the output from the second coupler in arc form and the output from the third coupler in arc form are switched in response to the output from the second coupler for a control signal.

6. The rotation information transmission apparatus according to claim 4, further comprising a register for storing the output from the second coupler in arc form and the output from the third coupler in arc form.

7. The rotation information transmission apparatus according to claim 1, wherein
the second coupler in arc form and the third coupler in arc form are arranged at a distance where different digital signals from the first coupler in arc form can be received, and
the rotation information transmission apparatus further comprises a switch for switching the output from the second coupler in arc form and the output from the third coupler in arc form.

8. The rotation information transmission apparatus according to claim 7, wherein
the first substrate further comprises a first coupler for a control signal,
the second substrate comprises a second coupler for a control signal in a location where coupling with the first coupler for a control signal is possible while the first substrate rotates, and
the output from the second coupler in arc form and the output from the third coupler in arc form are switched in response to the output from the second coupler for a control signal.

9. The rotation information transmission apparatus according to claim 7, further comprising a register for storing the output from the second coupler in arc form and the output from the third coupler in arc form.

10. The rotation information transmission apparatus according to claim 1, wherein
the first coupler in arc form, the second coupler in arc form and the third coupler in arc form respectively comprise a signal line in arc form and a feedback path in arc form, and
one end of the signal lines and one end of the feedback paths are matching terminated through a terminal resistor.

11. The rotation information transmission apparatus according to claim 1, wherein
the first coupler in arc form, the second coupler in arc form and the third coupler in arc form respectively comprise a signal line in arc form and a feedback path in arc form, and
one end of the signal lines and one end of the feedback paths are short-circuited.

12. The rotation information transmission apparatus according to claim 1, wherein
the center angle of the first coupler in arc form is 350° or greater, and
the length of the arc of the second coupler in arc form and the length of the arc of the third coupler in arc form are not longer than the length for securing the bandwidth of the digital signals to be used.

* * * * *